United States Patent
Cheng et al.

(10) Patent No.: US 12,001,110 B2
(45) Date of Patent: Jun. 4, 2024

(54) TUNABLE ATTENUATION OF LIGHT TRANSMISSION ARTIFACTS IN WEARABLE DISPLAYS

(71) Applicant: Magic Leap, Inc., Plantation, FL (US)

(72) Inventors: Hui-Chuan Cheng, Cooper City, FL (US); David Manly, Fort Lauderdale, FL (US); Vaibhav Mathur, Weston, FL (US); Joshua Naaman Haddock, Fort Lauderdale, FL (US); Kevin Messer, Mountain View, CA (US); Clinton Carlisle, Parkland, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/359,146

(22) Filed: Jun. 25, 2021

(65) Prior Publication Data

US 2021/0405402 A1    Dec. 30, 2021

Related U.S. Application Data

(60) Provisional application No. 63/044,013, filed on Jun. 25, 2020.

(51) Int. Cl.
*G02F 1/137* (2006.01)
*G02B 25/00* (2006.01)
(Continued)

(52) U.S. Cl.
CPC ........... *G02F 1/137* (2013.01); *G02B 25/001* (2013.01); *G02B 27/0172* (2013.01); *G02F 1/0136* (2013.01); *G02F 1/133531* (2021.01); *G02F 1/133541* (2021.01); *G02F 1/133634* (2013.01); *G02F 1/133638* (2021.01); *G02F 1/1347* (2013.01); *G02B 2027/0118* (2013.01);
(Continued)

(58) Field of Classification Search
CPC ..................... G02B 2027/0118; G02F 1/1347
See application file for complete search history.

(56) References Cited

U.S. PATENT DOCUMENTS

| 5,594,570 | A | 1/1997 | Hirata et al. |
| 7,758,185 | B2 | 7/2010 | Lewis |

(Continued)

FOREIGN PATENT DOCUMENTS

| WO | WO-2005124431 A1 * | 12/2005 | ............. G01C 21/36 |
| WO | 2017176861 A1 | 10/2017 | |

(Continued)

OTHER PUBLICATIONS

Azuma, "A Survey of Augmented Reality," Presence: Teleoperators and Virtual Environments, Aug. 1997, 6(4):355-385.
(Continued)

*Primary Examiner* — Alexander P Gross
(74) *Attorney, Agent, or Firm* — Fish & Richardson P.C.

(57) ABSTRACT

A method for displaying an image using a wearable display system including directing display light from a display towards a user through an eyepiece to project images in the user's field of view, determining a relative location between an ambient light source and the eyepiece, and adjusting an attenuation of ambient light from the ambient light source through the eyepiece depending on the relative location between the ambient light source and the eyepiece.

16 Claims, 20 Drawing Sheets

(51) Int. Cl.
*G02B 27/01* (2006.01)
*G02F 1/01* (2006.01)
*G02F 1/1335* (2006.01)
*G02F 1/13363* (2006.01)
*G02F 1/1347* (2006.01)

(52) U.S. Cl.
CPC ............... *G02B 2027/0138* (2013.01); *G02B 2027/014* (2013.01); *G02B 2027/0178* (2013.01); *G02F 2203/48* (2013.01); *G02F 2413/02* (2013.01)

(56) References Cited

U.S. PATENT DOCUMENTS

| | | | |
|---|---|---|---|
| 8,353,594 | B2 | 1/2013 | Lewis |
| 8,696,113 | B2 | 4/2014 | Lewis |
| 8,733,927 | B1 | 5/2014 | Lewis |
| 8,733,928 | B1 | 5/2014 | Lewis |
| 9,010,929 | B2 | 4/2015 | Lewis |
| 9,235,064 | B2 | 1/2016 | Lewis |
| 9,239,473 | B2 | 1/2016 | Lewis |
| 9,244,293 | B2 | 1/2016 | Lewis |
| 9,658,473 | B2 | 5/2017 | Lewis |
| 10,151,937 | B2 | 12/2018 | Lewis |
| 10,185,147 | B2 | 1/2019 | Lewis |
| 11,009,737 | B1 | 5/2021 | Matsuda et al. |
| 11,067,809 | B1 | 7/2021 | Sears et al. |
| 11,181,741 | B1 | 11/2021 | Yaroshchuk et al. |
| 2005/0180017 | A1 | 8/2005 | Hara et al. |
| 2006/0285207 | A1 | 12/2006 | Hay |
| 2008/0151160 | A1* | 6/2008 | Wang ............... G02F 1/133555 438/30 |
| 2009/0051707 | A1* | 2/2009 | Hirata ............... G09G 3/3648 348/731 |
| 2011/0069267 | A1* | 3/2011 | Moon ............... G02F 1/133632 349/127 |
| 2011/0170040 | A1* | 7/2011 | Park ............... G02F 1/13718 349/96 |
| 2012/0169950 | A1 | 7/2012 | Tatzel et al. |
| 2013/0127980 | A1 | 5/2013 | Haddick et al. |
| 2013/0176704 | A1 | 7/2013 | Lanman et al. |
| 2014/0233105 | A1 | 8/2014 | Schmeder et al. |
| 2015/0205126 | A1* | 7/2015 | Schowengerdt ..... H04N 13/344 345/633 |
| 2016/0291230 | A1 | 10/2016 | Weichelt et al. |
| 2017/0336641 | A1 | 11/2017 | Von Und Zu Liechtenstein |
| 2018/0059414 | A1 | 3/2018 | Campbell et al. |
| 2018/0113334 | A1 | 4/2018 | Fang et al. |
| 2018/0136471 | A1 | 5/2018 | Miller et al. |
| 2018/0180890 | A1 | 6/2018 | Baerenrodt et al. |
| 2018/0188536 | A1* | 7/2018 | Bell ............... G02B 5/23 |
| 2018/0239146 | A1 | 8/2018 | Bierhuizen et al. |
| 2018/0275415 | A1 | 9/2018 | Schowengerdt et al. |
| 2019/0086672 | A1 | 3/2019 | Kim et al. |
| 2019/0107719 | A1 | 4/2019 | Edwin et al. |
| 2019/0187474 | A1 | 6/2019 | Bhargava et al. |
| 2019/0216307 | A1 | 7/2019 | Coon et al. |
| 2019/0227321 | A1* | 7/2019 | Lee ............... G02B 27/0101 |
| 2019/0353943 | A1 | 11/2019 | Smith et al. |
| 2020/0116995 | A1 | 4/2020 | Chi et al. |
| 2020/0150425 | A1 | 5/2020 | Hatzilias et al. |
| 2020/0341268 | A1* | 10/2020 | Amirsolaimani .... G02B 27/286 |
| 2021/0041711 | A1 | 2/2021 | Sharp et al. |
| 2021/0080763 | A1 | 3/2021 | Sulai et al. |
| 2021/0116712 | A1 | 4/2021 | Manly et al. |
| 2021/0278672 | A1 | 9/2021 | Messer et al. |
| 2021/0364799 | A1 | 11/2021 | Guo et al. |

FOREIGN PATENT DOCUMENTS

| | | | |
|---|---|---|---|
| WO | 2018152233 | A1 | 8/2018 |
| WO | 2018224802 | A1 | 12/2018 |
| WO | 2019220774 | A1 | 11/2019 |
| WO | 2019241575 | A1 | 12/2019 |
| WO | 2020069026 | A1 | 4/2020 |

OTHER PUBLICATIONS

Azuma, "Predictive tracking for augmented reality." Dissertation for the degree of Doctor of Philosophy, University of North Carolina at Chapel Hill, Department of Computer Science, Feb. 1995, 262 pages.
Bimber et al., "Spatial Augmented Reality Merging Real and Virtual Worlds," A K Peters, Ltd. (ed.), 2005, 393 pages.
hitl.washington.edu [online], "Hardware," available on or before Oct. 13, 2005, via Internet Archive: Wayback Machine URL <https://web.archive.org/web/20051013062315/http:/www.hitl.washington.edu:80/artoolkit/documentation/hardware.htm>, retrieved on Mar. 3, 2021, URL <http://www.hitl.washington.edu/artoolkit/documentation/hardware.htm>, 3 pages.
Jacob, "Eye Tracking in Advanced Interface Design," Virtual environments and advanced interface design, 1995, 258:288, 50 pages.
PCT Invitation to Pay Additional Fees in International Appln. No. PCT/US2020/055817, dated Dec. 9, 2020, 2 pages.
PCT Search Report and Written Opinion in International Appln. No. PCT/US2020/055817, dated Feb. 9, 2021, 10 pages.
PCT Search Report and Written Opinion in International Appln. No. PCT/US2021/021224, dated Jun. 2, 2021, 10 pages.
Rao et al., "Viewing angle controllable displays with a blue-phase liquid crystal cell," Optics Express, Feb. 2010, 18(3):3143-3148.
Tanriverdi et al., "Interacting with Eye Movements in Virtual Environments," Proc. of the SIGCHI Conference on Human Factors in Computing Systems, 2000, pp. 265-272.
Yan et al., "Extended Kerr effect of polymer-stabilized blue-phase liquid crystals," Appl. Phys. Lett., 2010, 96(7):071105, 6 pages.
International Search Report and Written Opinion in International Appln. No. PCT/US2021/039211, dated Sep. 30, 2021, 9 pages.
Extended European Search Report in European Appln. No. 20877154.3, dated Oct. 10, 2023, 12 pages.
Extended European Search Report in European Appln. No. 21765145.4, dated Feb. 20, 2024, 9 pages.
Office Action in Japanese Appln. No. 2022-552801, dated Feb. 26, 2024, 6 pages (with English translation).

* cited by examiner

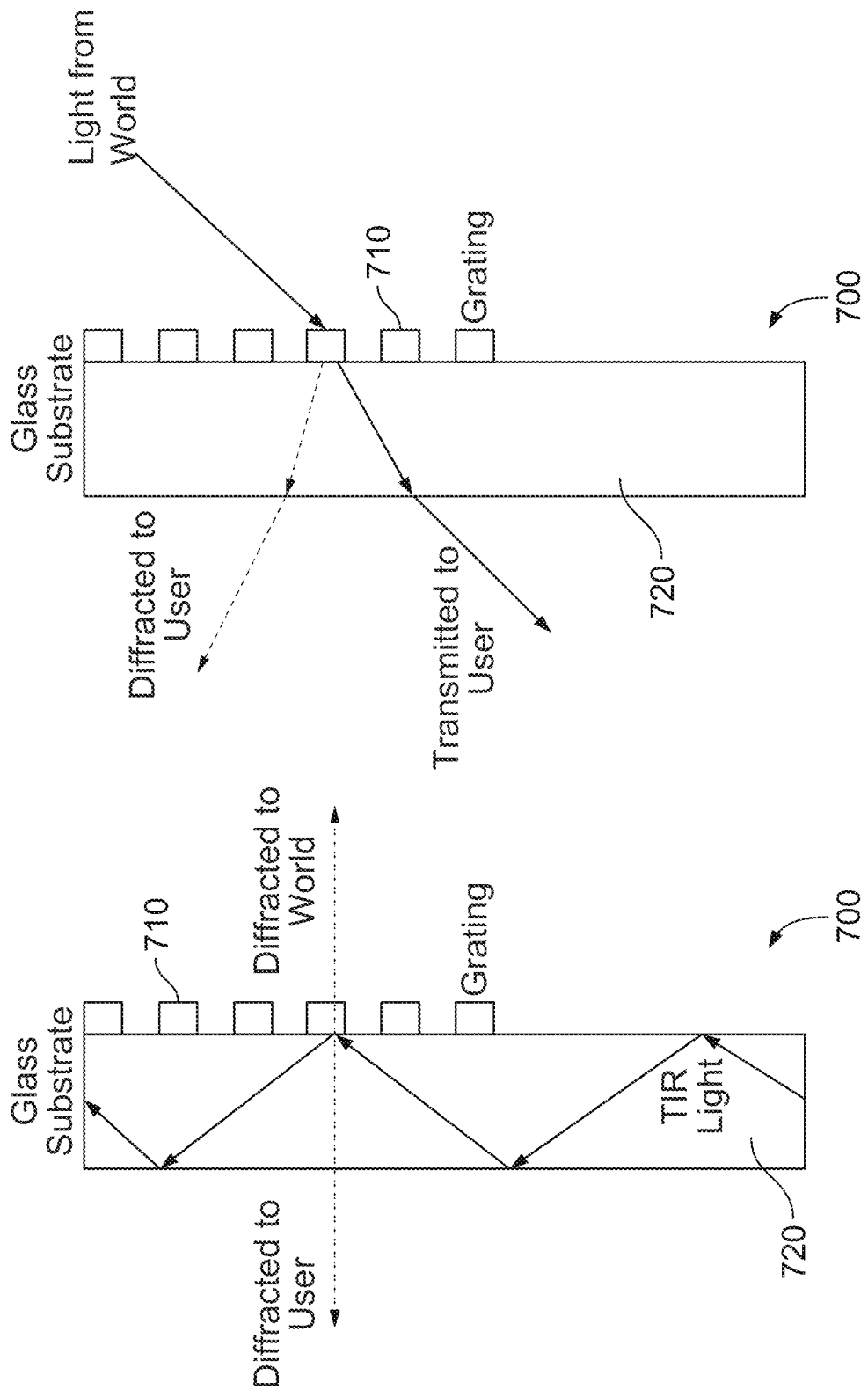

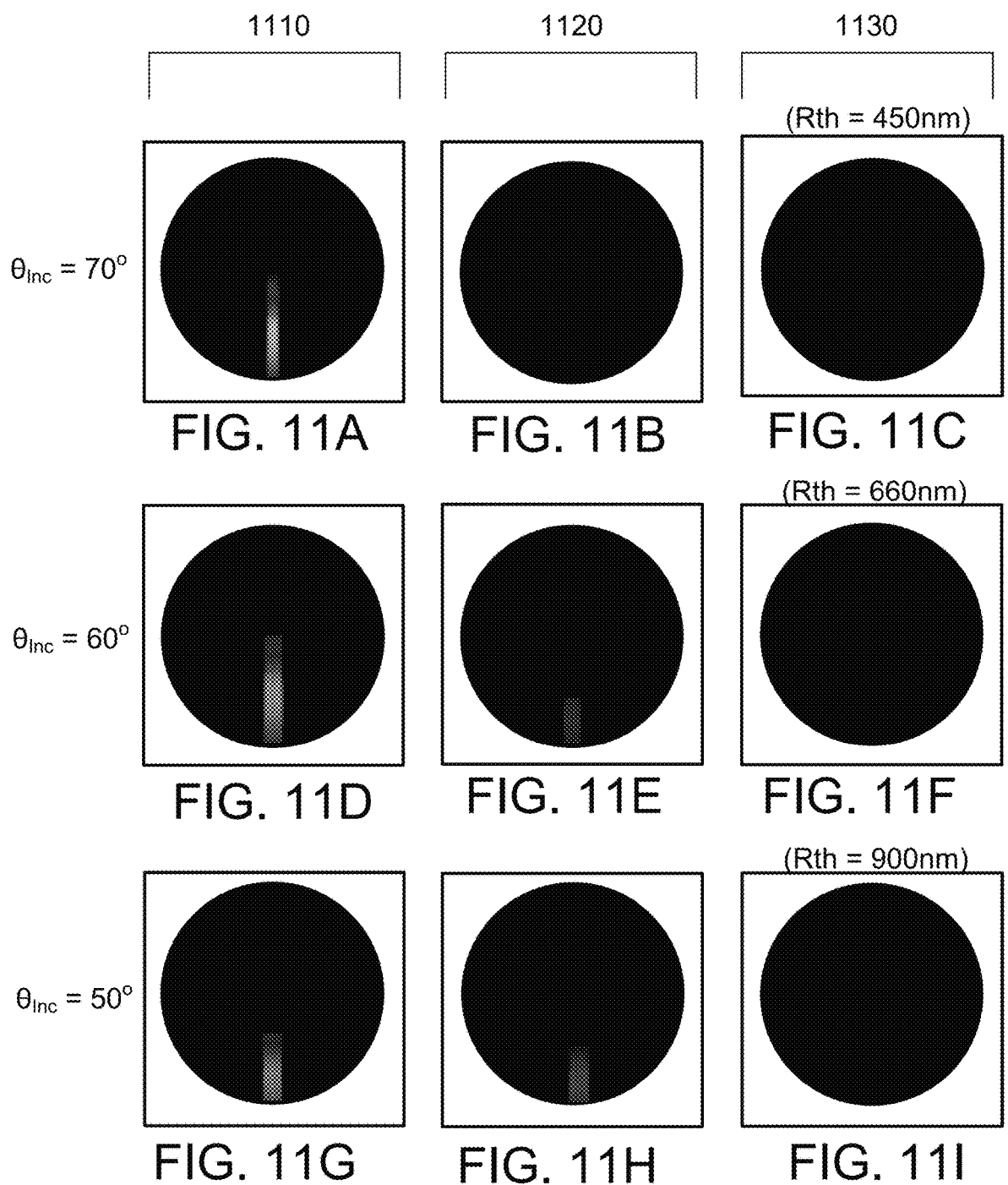

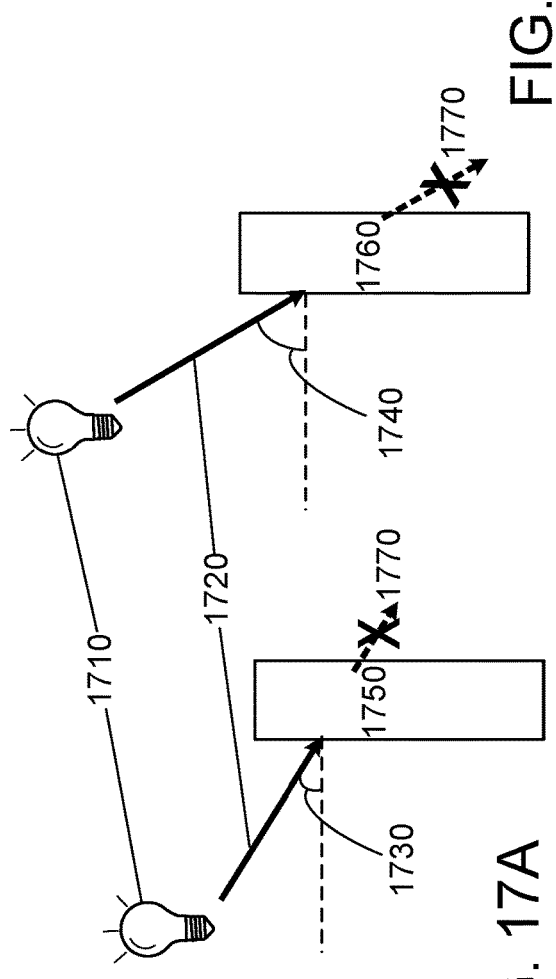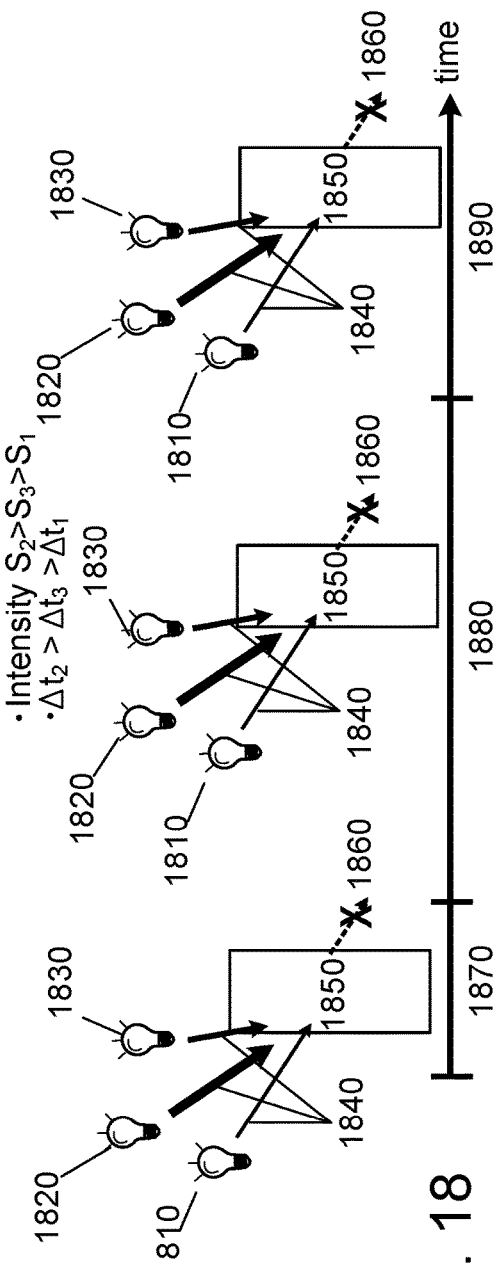

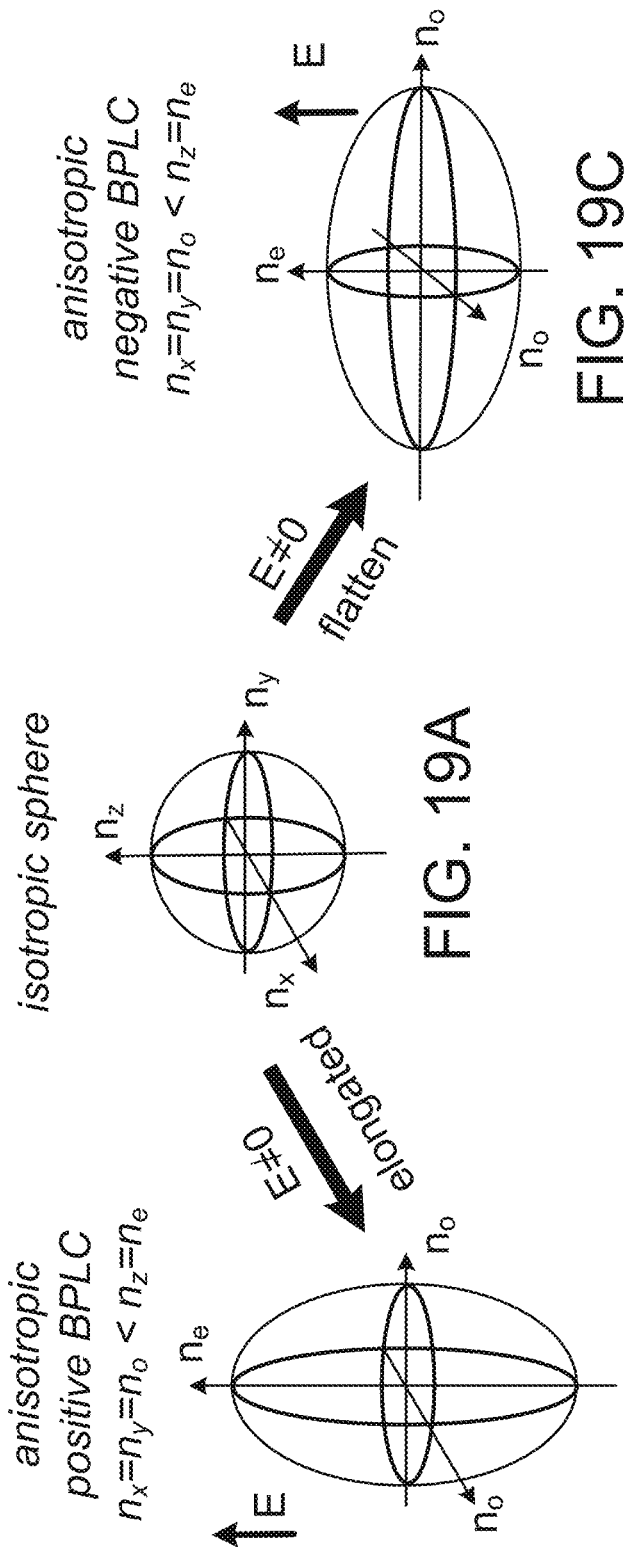

TUNABLE ATTENUATION OF LIGHT TRANSMISSION ARTIFACTS IN WEARABLE DISPLAYS

CROSS-REFERENCE TO RELATED APPLICATIONS

This application claims the benefit under 35 U.S.C. § 119(e) of U.S. patent application Ser. No. 63/044,013, entitled "Tunable Attenuation of Light Transmission Artifacts in Wearable Displays," filed Jun. 25, 2020, which is incorporated herein by reference in its entirety.

TECHNICAL FIELD

This disclosure relates to techniques for tunable attenuation of light transmission artifacts in wearable displays.

BACKGROUND

Optical imaging systems, such as wearable display systems (e.g., wearable display headsets) can include one or more eyepieces that present projected images to a user. Eyepieces can be constructed using thin layers of one or more highly refractive materials. As examples, eyepieces can be constructed from one or more layers of highly refractive glass, silicon, metal, or polymer substrates.

Multiple eyepieces can be used in conjunction to project a simulated three-dimensional image. For example, multiple eyepieces—each having a different pattern—can be layered one atop another, and each eyepiece can project a different depth layer of a volumetric image. Thus, the eyepieces can collectively present the volumetric image to the user across three-dimensions. This can be useful, for example, in presenting the user with a "virtual reality" environment.

Optical elements in a wearable display system can also interact with ambient light, which is light from the environment that the user is in. For example, diffractive structures in a wearable display system can diffract ambient light incident on the wearable display at a high angle, which would ordinarily not enter the users field of view, into the field of view creating visible artifact that diminishes the user's experience.

SUMMARY

Wearable display systems are described that include angularly selective films to mitigate artifacts associated with ambient light incident of high incidence angles. For example, angularly selective films can utilize polarizers in combination with polarization adjusting elements for which the amount of adjustment varies depending on the angle of incidence of the light, to reduce transmission of light at certain incidence angles. In certain embodiments, the angularly selective film can include a dynamic element in which the transmission properties can be varied in response to certain stimuli, such as in response to an electric field.

Various aspects of the invention are summarized as follows.

In general, in a first aspect, the invention features a method for displaying an image using a wearable display system, including: directing display light from a display towards a user through an eyepiece to project images in the user's field of view; determining a relative location between an ambient light source and the eyepiece; and adjusting an attenuation of ambient light from the ambient light source through the eyepiece depending on the relative location between the ambient light source and the eyepiece.

Embodiments of the method for displaying an image using a wearable display system can include one or more of the following features. For example, determining the relative location comprises determining an angle of incidence of the ambient light from the ambient light source on the eyepiece and the attenuation is adjusted based on the angle of incidence. The attenuation can be adjusted to reduce transmission of the ambient light at the angle of incidence compared to the attenuation at lower angles of incidence.

Attenuating the ambient light can include polarizing the ambient light to provide polarized light and modulating a polarization state of the polarized light as a function of angle of incidence of the ambient light. The attenuation can be varied by varying the modulation of the polarization state of the polarized light. The modulation can be varied by varying retardation provided by a layer of a birefringent material in a path of the polarized light. The birefringent material can include a liquid crystal. The retardation can be varied by varying an electric field applied to the liquid crystal. The liquid crystal can be a blue phase liquid crystal or a vertically-aligned liquid crystal.

Attenuating the ambient light further can include directing the modulated polarized light through a second polarizer. The attenuation can be varied using a liquid crystal element.

Determining the relative location between the ambient light source and the eyepiece can include monitoring ambient light intensity and determining the relative location based on changes in the monitored ambient light intensity. The ambient light intensity can be monitored by acquiring images of the ambient environment and analyzing the acquired images to determine a location of the ambient light source in the images.

In a second aspect, the invention features a wearable display system, including: an eyepiece stack having a world side and a user side opposite the world side, wherein during use a user positioned on the user side views displayed images delivered by the wearable display system via the eyepiece stack which augment the user's field of view of the user's environment; a tunable attenuator arranged on the world side of the of the eyepiece stack, the tunable attenuator comprising an electro-optic cell arranged between pair of linear polarizers; a camera module facing the world side; and an electronic processing module in communication with the tunable attenuator and the camera module, the electronic processing module being programmed to determine information about a relative location of the eyepiece stack to an ambient light source based on images captured by the camera module and to vary the attenuation of the tunable attenuator based on information about the relative location.

Embodiments of the wearable display system can include one or more of the following features. The tunable attenuator can reduce transmission of visible light incident on the tunable attenuator in a first range of incident angles without significantly reducing transmission of light incident on the tunable attenuator at angles of incidence outside the first range.

The electro-optic cell can include a layer of a liquid crystal material and the tunable attenuator further can include a voltage source arranged to apply a variable voltage to the liquid crystal material. The liquid crystal material can be a blue phase liquid crystal material or a vertically-aligned liquid crystal material. The tunable attenuator can further include at least one layer of a birefringent material in addition to the layer of liquid crystal material.

At least one layer of birefringent material can include a pair of quarter wave plates, the quarter wave plates being disposed on opposite sides of the layer of liquid crystal material. Each quarter wave plate can be arranged relative to a corresponding one of the linear polarizers to form a circular polarizer. At least one layer of birefringent material further can include a C-plate.

In some embodiments, the pass axes of the two linear polarizers can be crossed.

The electro-optic cell can rotate a polarization state of light transmitted by a first linear polarizer of the pair of linear polarizers on the world side of the tunable attenuator. An amount of rotation of the polarization state can vary depending on a state of the electro-optic cell and an angle of incidence of light transmitted by the first linear polarizer of the pair of linear polarizers. The light transmitted having large angles of incidence can be rotated less than the light transmitted having small angles of incidence.

The tunable attenuator can have an area greater than 50 mm×50 mm.

The electro-optic cell can be a first electro-optic cell and the tunable attenuator can further include a second electro-optic cell and a third linear polarizer, the second electro-optic cell being arranged between the pair of linear polarizers and the third linear polarizer. The first and second electro-optic cells can be each composed of a corresponding layer of a liquid crystal material. The tunable attenuator can further comprises one or more layers of birefringent materials arranged on opposite sides of the corresponding layer of liquid crystal material.

The tunable attenuator can include two or more stages, each stage comprising an electro-optic cell arranged between a pair of linear polarizers. Adjacent stages can share a linear polarizer.

Among other advantages, implementations of the invention can reduce undesirable optical artifacts (e.g., rainbow effects) in certain wearable displays associated with stray ambient light interacting with grating structures in the displays. For example, waveguide based wearable displays (e.g., for AR/MR applications) that employ surface relief gratings can diffract stray ambient light into the eyebox of the display, resulting in unwanted artifacts in the user's field of view, diminishing the user's experience. Implementations of the invention can significantly reduce such artifacts without significantly impacting the user's viewed field.

Implementations can attenuate the transmission of ambient light based on its angle of incidence. For instance, a film that selectively attenuates light for angles of incidence larger than the user's field-of-view can mitigate the visibility of the artifacts generated by the diffractive near-eye-display without sacrificing the transmission of the user's view of the world.

The details of one or more embodiments are set forth in the accompanying drawings and the description below. Other features and advantages will be apparent from the description and drawings, and from the claims.

DESCRIPTION OF DRAWINGS

FIGS. 7A and 7B are schematic diagrams illustrating light paths through a display combiner having a surface relief grating.

FIGS. 11A-11I is a chart of different simulated rainbow artifacts corresponding to three different eyepiece examples each at three different angles of incidence.

FIGS. 17A and 17B are schematic diagrams comparing light transmission through a display combiner at different incidence angles.

FIG. 18 is a schematic diagram comparing multiple light transmissions through a display combiner at multiple incidence angles over time.

FIG. 19A-19C are schematic diagrams of index ellipsoids comparing an isotropic medium to different blue phase LC materials.

In the figures, like references indicate like elements.

DETAILED DESCRIPTION

Figure 1:
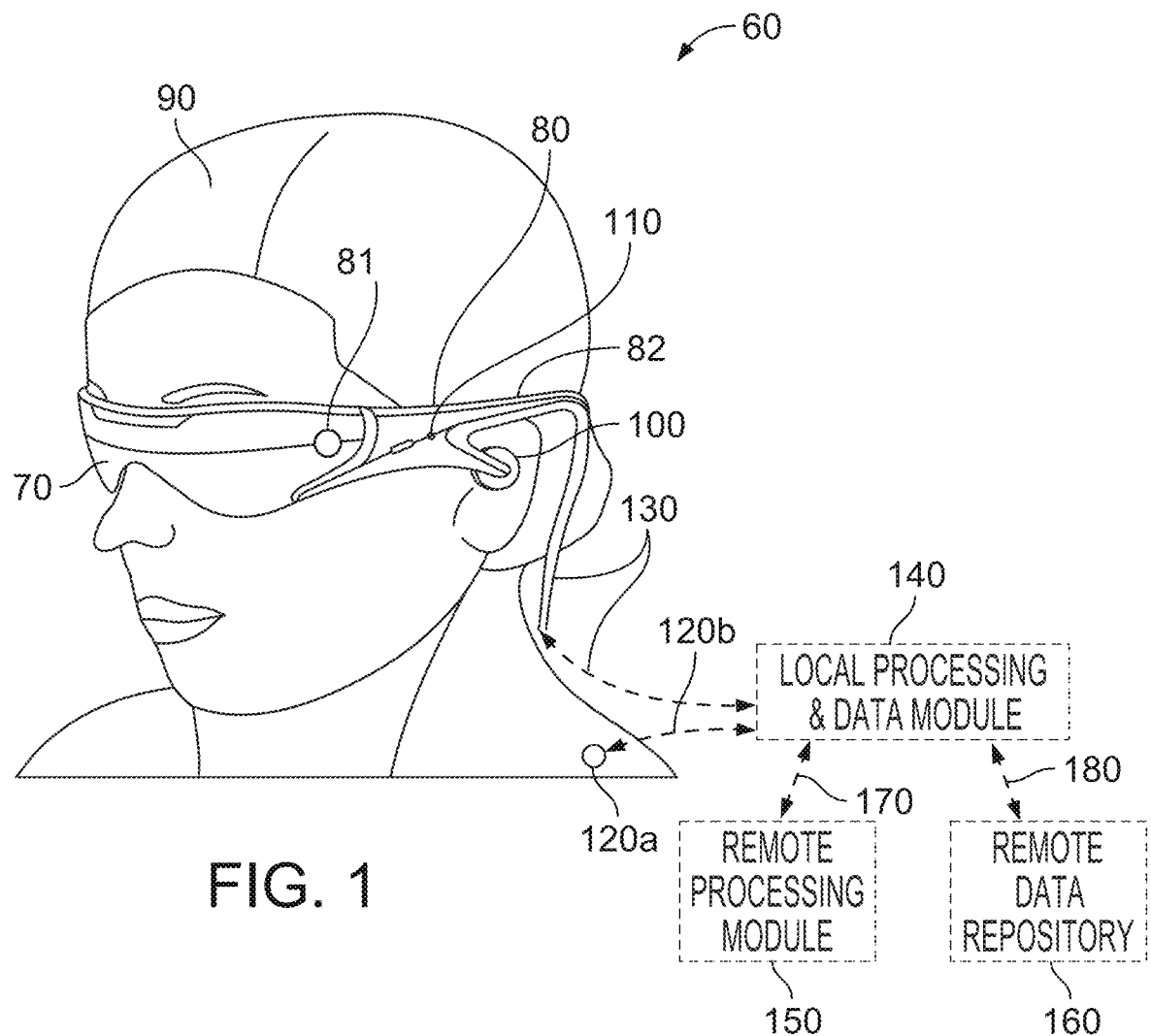
FIG. 1 shows an example of a wearable display system.

FIG. 1 illustrates an example wearable display system 60 that includes a display or eyepiece 70, and various mechanical and electronic modules and systems to support the functioning of that display 70. The display 70 is housed in a frame 80, which is wearable by a display system user 90 and which is configured to position the display 70 in front of the eyes of the user 90. The display 70 may be considered eyewear in some embodiments. A world-viewing (e.g., facing the user's environment and having a similar field of view) camera 81 is mounted in frame 80. In some embodiments, a speaker 100 is coupled to the frame 80 and is positioned adjacent the ear canal of the user 90. The display system may also include one or more microphones 110 to detect sound. The microphone 110 can allow the user to provide inputs or commands to the system 60 (e.g., the selection of voice menu commands, natural language questions, etc.), and/or can allow audio communication with other persons (e.g., with other users of similar display systems). The microphone 110 can also collect audio data from the user's surroundings (e.g., sounds from the user and/or environment). In some embodiments, the display system may also include a peripheral sensor 120a, which may be separate from the frame 80 and attached to the body of the user 90 (e.g., on the head, torso, an extremity, etc.). The peripheral sensor 120a may acquire data characterizing the physiological state of the user 90 in some embodiments.

The display 70 is operatively coupled by a communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 90 (e.g., in a backpack-style configuration or in a belt-coupling style configuration). Similarly, the sensor 120 a may be operatively coupled by communications link 120 b (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 90), such as image capture devices (e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone devices that communicate with the local processing and data module 140 by wired or wireless communication pathways.

The remote processing module 150 may include one or more processors to analyze and process data, such as image and audio information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module, allowing fully autonomous use from a remote module.

Figure 2A:
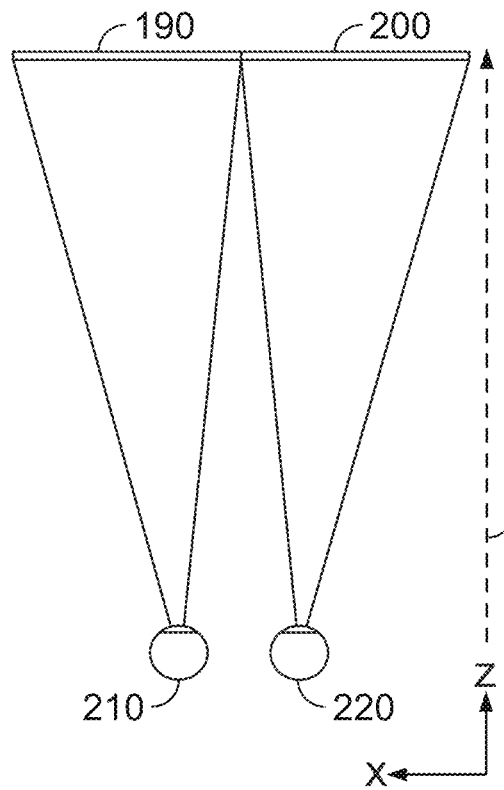
FIG. 2A shows a conventional display system for simulating three-dimensional image data for a user.

The perception of an image as being "three-dimensional" or "3-D" may be achieved by providing slightly different presentations of the image to each eye of the user. FIG. 2A illustrates a conventional display system for simulating three-dimensional image data for a user. Two distinct images 190, 200—one for each eye 210, 220—are output to the user. The images 190, 200 are spaced from the eyes 210, 220 by a distance 230 along an optical or z-axis that is parallel to the line of sight of the user. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

However, the human visual system is complicated and providing a realistic perception of depth is challenging. For example, many users of conventional "3-D" display systems find such systems to be uncomfortable or may not perceive a sense of depth at all. Objects may be perceived as being "three-dimensional" due to a combination of vergence and accommodation. Vergence movements (e.g., rotation of the eyes so that the pupils move toward or away from each other to converge the respective lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, under normal conditions, a change in vergence will trigger a matching change in accommodation of lens shape and pupil size. As noted herein, many stereoscopic or "3-D" display systems display a scene using slightly different presentations (and, so, slightly different images) to each eye such that a three-dimensional perspective is perceived by the human visual system. Such systems can be uncomfortable for some users, however, since they simply provide image information at a single accommodated state and work against the "accommodation-vergence reflex." Display systems that provide a better match between accommodation and vergence may form more realistic and comfortable simulations of three-dimensional image data.

Figure 2B:
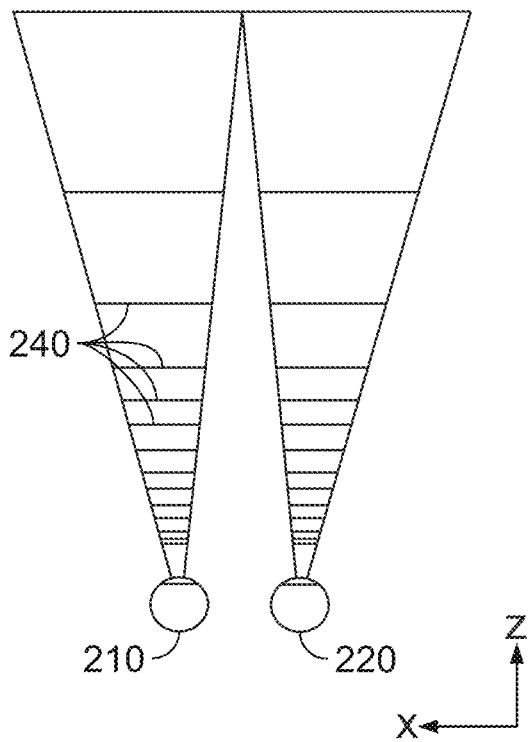
FIG. 2B shows aspects of an approach for simulating three-dimensional image data using multiple depth planes.

FIG. 2B illustrates aspects of an approach for simulating three-dimensional image data using multiple depth planes. With reference to FIG. 2B, the eyes 210, 220 assume different accommodated states to focus on objects at various distances on the z-axis. Consequently, a particular accommodated state may be said to be associated with a particular one of the illustrated depth planes 240, which has an associated focal distance, such that objects or parts of objects in a particular depth plane are in focus when the eye is in the accommodated state for that depth plane. In some embodiments, three-dimensional image data may be simulated by providing different presentations of an image for each of the eyes 210, 220, and also by providing different presentations of the image corresponding to multiple depth planes. While the respective fields of view of the eyes 210, 220 are shown as being separate for clarity of illustration, they may overlap, for example, as distance along the z-axis increases. In addition, while the depth planes are shown as being flat for ease of illustration, it will be appreciated that the contours of a depth plane may be curved in physical space, such that all features in a depth plane are in focus with the eye in a particular accommodated state.

Figure 3A:
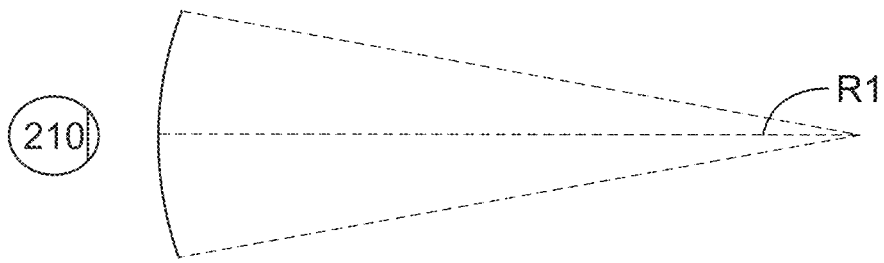
FIGS. 3A-3C show relationships between radius of curvature and focal radius.
Figure 3B:
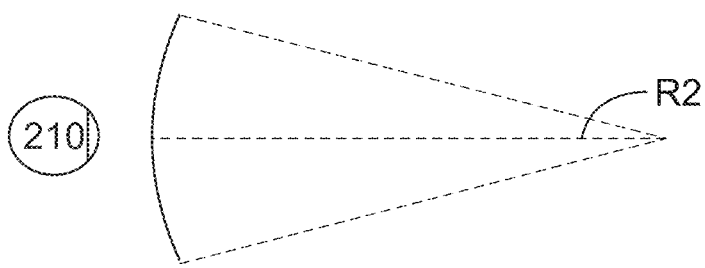
Figure 3C:
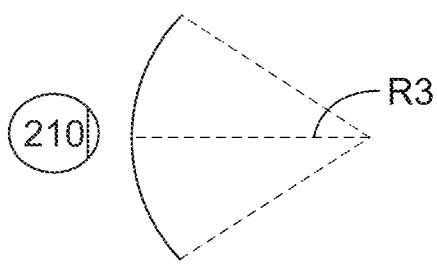

The distance between an object and an eye 210 or 220 may also change the amount of divergence of light from that object, as viewed by that eye. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the user's eye 210. While only a single eye 210 is illustrated for clarity of illustration in FIGS. 3A-3C and other figures herein, it will be appreciated that the discussions regarding the eye 210 may be applied to both eyes 210 and 220 of a user.

A highly believable simulation of perceived depth may be achieved by providing, to the eye, different presentations of an image corresponding to each of a limited number of depth planes. The different presentations may be separately focused by the user's eye, thereby helping to provide the user with depth cues based on the amount of accommodation of the eye required to bring into focus different image features for the scene located on different depth planes and/or based on observing different image features on different depth planes being out of focus.

Figure 4:
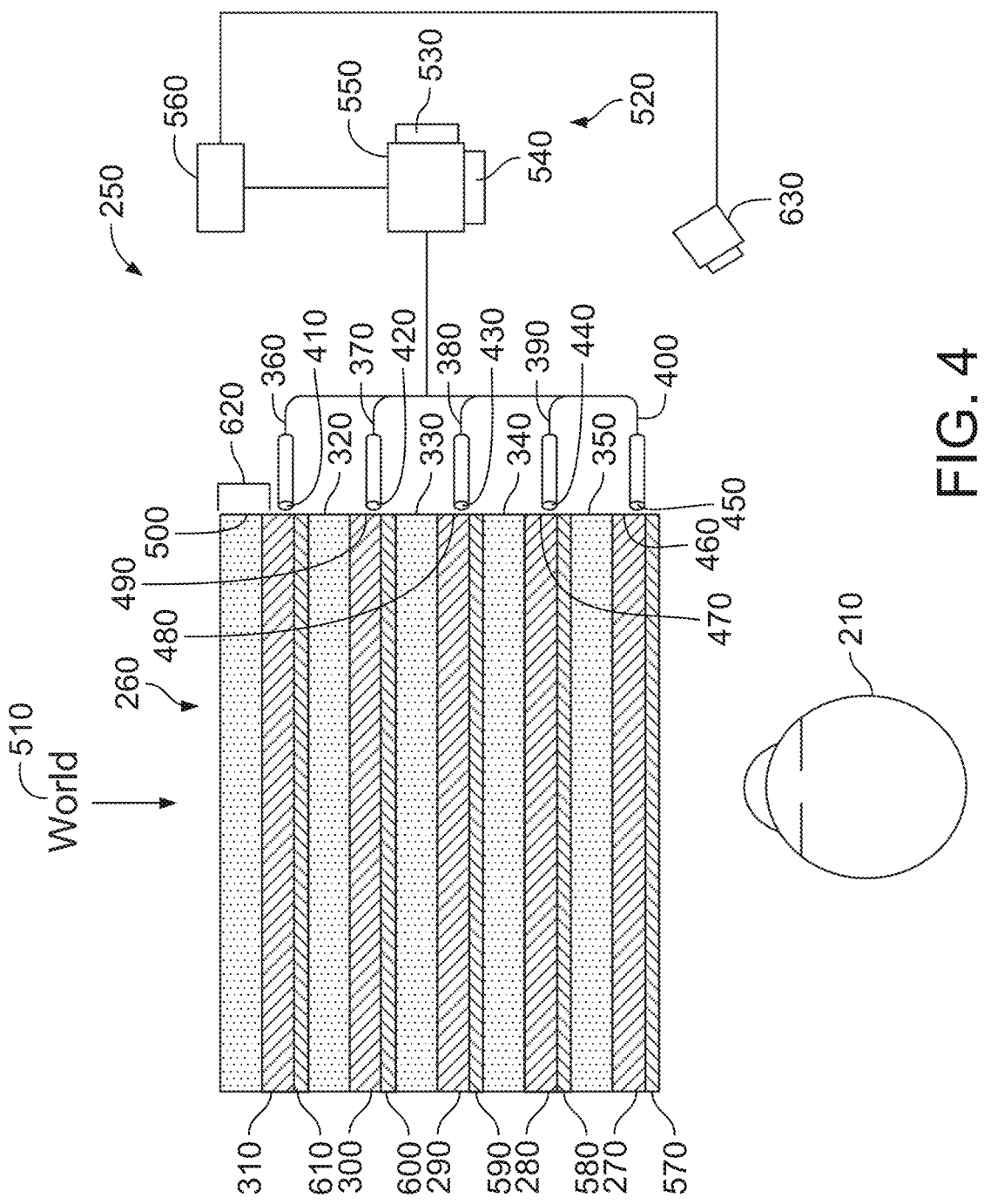
FIG. 4 shows an example of a waveguide stack for outputting image information to a user in an AR eyepiece.

FIG. 4 illustrates an example of a waveguide stack for outputting image information to a user in an AR eyepiece. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 1, with FIG. 4 schematically showing some parts of that system 60 in greater detail. For example, the waveguide assembly 260 may be part of the display 70 of FIG. 1. It will be appreciated that the display system 250 may be considered a light field display in some embodiments.

The waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of each respective image injection device 360, 370, 380, 390, 400 and is injected into a corresponding input surface 460, 470, 480, 490, 500 of the respective waveguides 270, 280, 290, 300, 310. In some embodiments, the each of the input surf aces 460, 470, 480, 490, 500 may be an edge of a corresponding waveguide, or may be part of a major surface of the corresponding waveguide (that is, one of the waveguide surfaces directly facing the world 510 or the user's eye 210). In some embodiments, a beam of light (e.g., a collimated beam) may be injected into each waveguide and may be replicated, such as by sampling into beamlets by diffraction, in the waveguide and then directed toward the eye 210 with an amount of optical power corresponding to the depth plane associated with that particular waveguide. In some embodiments, a single one of the image injection devices 360, 370, 380, 390, 400 may be associated with, and inject light into, a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may transmit image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors.

In some embodiments, the light injected into the waveguides 270, 280, 290, 300, 310 is provided by a light projector system 520, which includes a light module 530, which may include a light source or light emitter, such as a light emitting diode (LED). The light from the light module 530 may be directed to, and modulated by, a light modulator 540 (e.g., a spatial light modulator), via a beamsplitter (BS) 550. The light modulator 540 may spatially and/or temporally change the perceived intensity of the light injected into the waveguides 270, 280, 290, 300, 310. Examples of spatial light modulators include liquid crystal displays (LCD), including a liquid crystal on silicon (LCOS) displays, and MEMS micro-mirror arrays such as those used in digital light processing (DLP) displays. In some embodiments, light projector system 520 can include a light emitting diode (LED) display, such as a micro-LED display.

In some embodiments, the light projector system 520, or one or more components thereof, may be attached to the frame 80 (FIG. 1). For example, the light projector system 520 may be part of a temporal portion (e.g., ear stem 82) of the frame 80 or disposed at an edge of the display 70. In some embodiments, the light module 530 may be separate from the BS 550 and/or light modulator 540.

In some embodiments, the display system 250 may be a scanning fiber display comprising one or more scanning fibers to project light in various patterns (e.g., raster scan, spiral scan, Lissajous patterns, etc.) into one or more waveguides 270, 280, 290, 300, 310 and ultimately into the eye 210 of the user. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. One or more optical fibers may transmit light from the light module 530 to the one or more waveguides 270, 280, 290, 300, and 310. In addition, one or more intervening optical structures may be provided between the scanning fiber, or fibers, and the one or more waveguides 270, 280, 290, 300, 310 to, for example, redirect light exiting the scanning fiber into the one or more waveguides 270, 280, 290, 300, 310.

A controller 560 controls the operation of the stacked waveguide assembly 260, including operation of the image injection devices 360, 370, 380, 390, 400, the light source 530, and the light modulator 540. In some embodiments, the controller 560 is part of the local data processing module 140. The controller 560 includes programing (e.g., instructions in a non-transitory medium) that regulates the timing and provision of image information to the waveguides 270, 280, 290, 300, 310. In some embodiments, the controller may be a single integral device, or a distributed system connected by wired or wireless communication channels. The controller 560 may be part of the processing modules 140 or 150 (FIG. 1) in some embodiments.

The waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be output by the waveguide at locations at which the light propagating in the waveguide strikes a light extracting optical element. The out-coupling optical elements 570, 580, 590, 600, 610 may be, for example, diffractive optical features, including diffractive gratings, as discussed further herein. While the out-coupling optical elements 570, 580, 590, 600, 610 are illustrated as being disposed at the bottom major surfaces of the waveguides 270, 280, 290, 300, 310, in some embodiments they may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

Each waveguide 270, 280, 290, 300, 310 may output light to form an image corresponding to a particular depth plane. For example, the waveguide 270 nearest the eye may deliver collimated beams of light to the eye 210. The collimated beams of light may be representative of the optical infinity focal plane. The next waveguide up 280 may output collimated beams of light which pass through the first lens 350 (e.g., a negative lens) before reaching the eye 210. The first lens 350 may add a slight convex wavefront curvature to the collimated beams so that the eye/brain interprets light coming from that waveguide 280 as originating from a first focal plane closer inward toward the eye 210 from optical infinity. Similarly, the third waveguide 290 passes its output light through both the first lens 350 and the second lens 340 before reaching the eye 210. The combined optical power of the first lens 350 and the second lens 340 may add another incremental amount of wavefront curvature so that the eye/brain interprets light coming from the third waveguide 290 as originating from a second focal plane that is even closer inward from optical infinity than was light from the second waveguide 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate optical power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may output images set to the same depth plane, or multiple subsets of the waveguides 270, 280, 290, 300, 310 may output images set to the same plurality of depth planes, with one set for each depth plane. This can provide advantages for forming a tiled image to provide an expanded field of view at those depth planes.

The out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features with a diffractive efficiency sufficiently low such that only a portion of the power of the light in a beam is re-directed toward the eye 210 with each interaction, while the rest continues to move through a waveguide via TIR. Accordingly, the exit pupil of the light module 530 is replicated across the waveguide to create a plurality of output beams carrying the image information from light source 530, effectively expanding the number of locations where the eye 210 may intercept the replicated light source exit pupil. These diffractive features may also have a variable diffractive efficiency across their geometry to improve uniformity of light output by the waveguide.

In some embodiments, one or more diffractive features may be switchable between "on" states in which they actively diffract, and "off" states in which they do not significantly diffract. For instance, a switchable diffractive element may include a layer of polymer dispersed liquid crystal in which microdroplets form a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras) may be provided to capture images of the eye 210, parts of the eye 210, or at least a portion of the tissue surrounding the eye 210 to, for example, detect user inputs, extract biometric information from the eye, estimate and track the gaze direction of the eye, to monitor the physiological state of the user, etc. In some embodiments, the camera assembly 630 may include an image capture device and a light source to project light (e.g., IR or near-IR light) to the eye, which may then be reflected by the eye and detected by the image capture device. In some embodiments, the light source includes light emitting diodes ("LEDs"), emitting in IR or near-IR. In some embodiments, the camera assembly 630 may be attached to the frame 80 (FIG. 1) and may be in electrical communication with the processing modules 140 or 150, which may process image information from the camera assembly 630 to make various determinations regarding, for example, the physiological state of the user, the gaze direction of the wearer, iris identification, etc. In some embodiments, one camera assembly 630 may be utilized for each eye, to separately monitor each eye.

Figure 5:
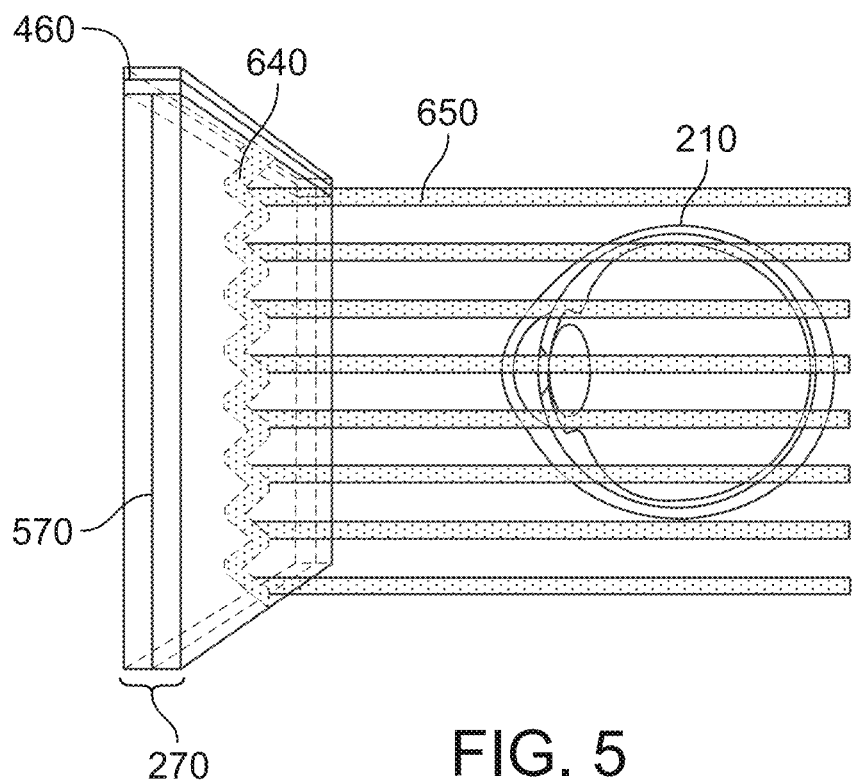
FIGS. 5 and 6 show examples of exit beams outputted by a waveguide.
Figure 6:
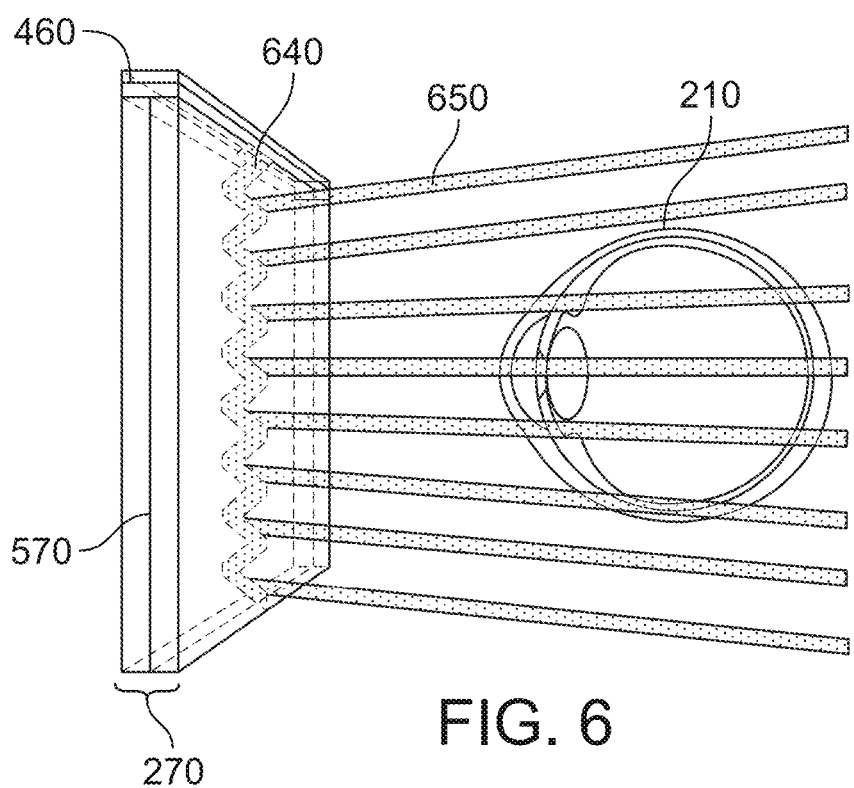

FIG. 5 illustrates an example of exit beams output by a waveguide. One waveguide is illustrated (with a perspective view), but other waveguides in the waveguide assembly 260 (FIG. 4) may function similarly. Light 640 is injected into the waveguide 270 at the input surface 460 of the waveguide 270 and propagates within the waveguide 270 by TIR. Through interaction with diffractive features, light exits the waveguide as exit beams 650. The exit beams 650 replicate the exit pupil from a projector device which projects images into the waveguide. Any one of the exit beams 650 includes a sub-portion of the total energy of the input light 640. And in a perfectly efficient system, the summation of the energy in all the exit beams 650 would equal the energy of the input light 640. The exit beams 650 are illustrated as being substantially parallel in FIG. 6 but, as discussed herein, some amount of optical power may be imparted depending on the depth plane associated with the waveguide 270. Parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, as shown in FIG. 6, which would require the eye 210 to accommodate to a closer distance to bring it into focus on the retina and would be interpreted by the brain as light from a distance closer to the eye 210 than optical infinity.

Additional information regarding wearable display systems (e.g., including optical elements used in wearable display systems) can be found in U.S. Patent Publication No. U.S. 2019/0187474 A1, filed Dec. 14, 2018, and entitled "EYEPIECES FOR AUGMENTED REALITY DISPLAY SYSTEM," the contents of which are incorporated by reference in their entirety.

As noted above, wearable display system 60 includes one or more optical elements having one or more grating structures that enhance an optical performance of the wearable display system. For example, referring to FIGS. 7A and 7B, a diffractive relief structure, grating 710, is used with a near-eye display combiner 700 (e.g., a stacked waveguide assembly as described above) as an exit pupil expander (EPE), increasing the size of the wearable display system's exit pupil. As illustrated in FIG. 7A, combiner 700 includes a waveguide 720 (e.g., a glass substrate) that guides edge-coupled light via total-internal-reflection (TIR) along its length while grating 710 diffracts incident guided light so that at least some of the light is extracted from light guide 710 towards the user of the display system.

Referring specifically to FIG. 7B, ambient light from the user's environment is also incident on display combiner 700 from the "world" side. This light interacts with grating 710 and at least some of this light can be diffracted into the user's field of view. When viewed by the user through the EPE, the light diffracted from the world can appear as an undesirable image artifact. The angles-of-incidence which generate artifacts in the user's field-of-view generally depends on the design on the display combiner. For diffractive waveguide based display combiners, large angles-of-incidence often result in stray light paths nearest the center of the user's world field-of-view.

Figure 8B:
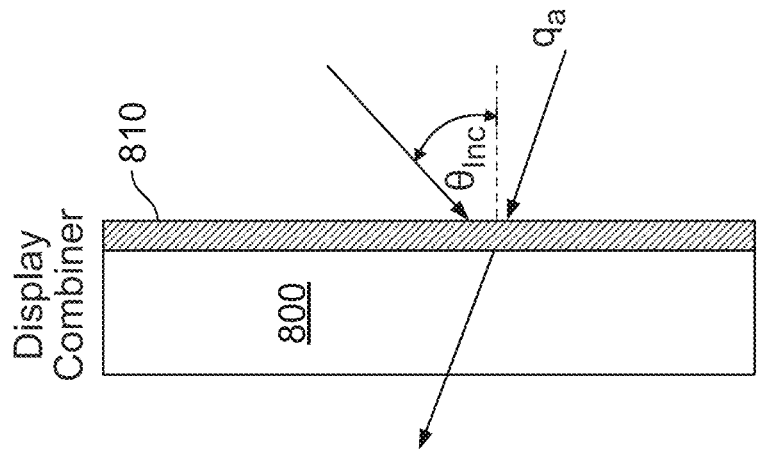
FIGS. 8A and 8B are schematic diagrams comparting light transmission through a display combiner with and without an angularly selective film.
Figure 8A:
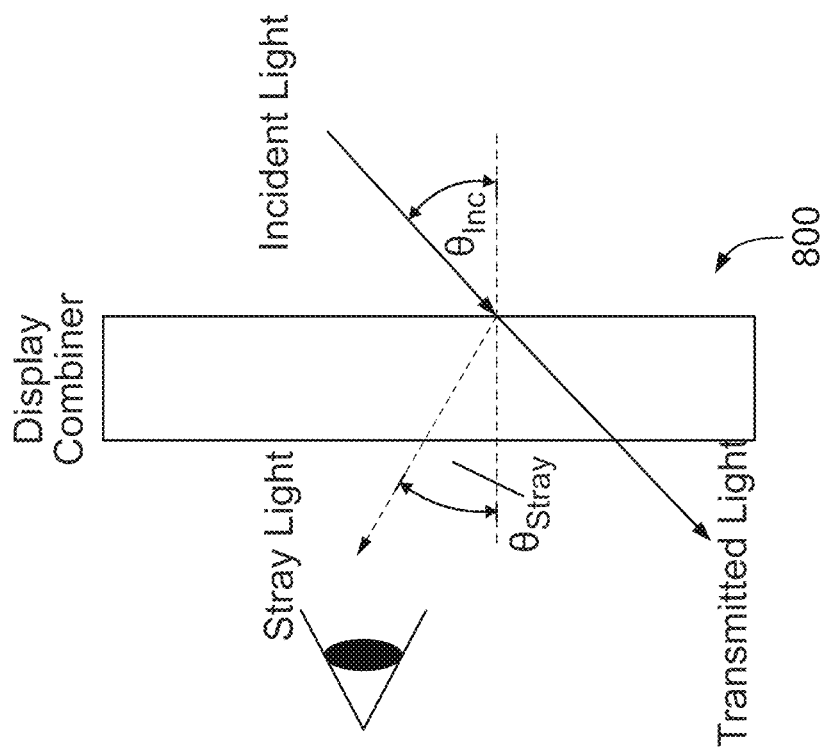

This effect is further illustrated in FIG. 8A, which shows a display combiner 800. Ambient light is incident on a front surface of display combiner 800 at an incident angle $\theta_{inc}$. At least some of the incident light is transmitted through the grating and the combiner as illustrated. However, display combiner 800 supports a grating (not shown) that diffracts at least some of the incident light toward the user. This light, labeled stray light, diffracts at an angle $\theta_{stray}$.

Referring to FIG. 8B, a tunable attenuator 810 can be applied to (e.g., bonded onto) display combiner 800 to variably reduce stray light artifacts associate with ambient light. Generally, the transmission of light through attenuator 810 depends on both the angle of incidence of the light on the film and on the optical state of one or more tunable layers of the attenuator. As illustrated, attenuator 810 attenuates (e.g., reduces or blocks) transmission of light having an angle of incident $\theta_{inc}$, that is relatively high (e.g., 30° or more, 35° or more, 40° or more, 45° or more, e.g., such as a user would experience from overhead lighting in indoor environments) but transmits light having a lower angle of incidence, $\theta_a$ (e.g., "world light" seen by the wearer in the core field of view of the device). As discussed in more detail below, attenuator 810 can vary the degree of attenuation at different incident angles, e.g., in response to variations in the ambient lighting conditions, such as varying relative orientation of ambient light sources relative to the display. The attenuator can perform this function over a broad range of wavelengths, e.g., over the operative wavelength range of the display system, such as from 420 nm to 680 nm.

In a given optical state, the transmission efficiency for incident light generally varies as a function of incident angle from relatively high transmission efficiency (e.g., 40% or more, 45% or more) to a relatively low transmission efficiency (e.g., less than 1%, less than 0.5%). Transmission efficiency refers to the relative intensity of light transmitted at a particular wavelength. In some embodiments, unpolarized light of wavelength in a range from 420 nm to 680 nm incident of the angularly selective film with an angle of incidence between 25° and 85° has a transmission efficiency less than 0.5%. The exact angle of minimum transmission efficiency can be adjusted within such an angular range.

The tunable attenuator can also have a relatively small impact on the color of images viewed through the film. For example, for a D65 source, the tunable attenuator can shift a (0.33, 0.33) CIE 1931 white point less than (+/−0.02, +/−0.02) (e.g., (+/−0.01, +/−0.01) or less) for unpolarized light with an angle of incidence within a prescribed angular range (e.g., ±40°).

Transmission of the tunable attenuator can also be characterized by attenuation, which can be high for at least some relatively high incident angles (e.g., 10 dB or more, 15 dB or more, 20 dB or more, 25 dB or more, 30 dB or more). Light at lower incident angles, such as 25° or less (e.g., 20° or less, 15° or less, 10° or less) can experience very low levels of attenuation (e.g., 2 dB or less, 1 dB or less).

Generally, tunable attenuator 810 can be relatively thin. For example, film 810 can have a total thickness in a range from 500 microns to 5,000 microns. Accordingly, the benefits of using the tunable attenuator can be achieved without adding significant bulk to the wearable display system.

In some embodiments, tunable attenuator 810 is composed of a multilayer stack that includes an electro-optic cell (e.g., a liquid crystal electro-optic cell) arranged between pair of polarizer films (e.g., linear polarizers). The polarizer films and electro-optic cell significantly reduces transmission of visible light incident on tunable attenuator 810 within a certain range of angles of incidence without significantly reducing transmission of light incident on the tunable attenuator at angles of incidence outside of that range.

In general, the configuration of the two polarizers and the electro-optic cell can vary to provide a desired level of transmission variation over an angular incidence range of interest (e.g., from −75° to +75°). In some embodiments, the polarizers are linear polarizers and the pass axes of the two linear polarizers can be crossed (e.g., at 90°).

Generally, the electro-optic cell includes one or more variably birefringent layers that are designed to switch between different optical states in which, in at least one state, the layers rotate a polarization state of light transmitted by a first of the pair of linear polarizers incident from the world side. The variably birefringent layers can include liquid crystal material (e.g., nematic phase liquid crystal material) that can be aligned so that, in␣the at least␣one state, an extraordinary axis of the liquid crystal material is parallel to a plane of the layer, (e.g., providing quarter wave (QW) retardation) and/or a homeotropic arrangement in which an extraordinary axis of the liquid crystal material is perpendicular to the plane of the layer.

Typically, the amount that the electro-optic cell rotates the polarization state varies depending on the configuration and phase of the liquid crystal material and depending on an angle of incidence of light transmitted by the first of the pair of linear polarizers. In some embodiments, the light transmitted having large angles of incidence (e.g., 35° or more) is rotated less than the light transmitted having small angles of incidence (e.g., less than 35°). For example, where the polarizers are crossed linear polarizers, the greater the amount of rotation, up to 90°, the greater then transmission efficiency of the film. In such cases, greater rotation for on-axis light compared to light at larger incident angles, is desirable. Conversely, in some embodiments, the polarizer axes are parallel and the polarization adjusting film rotates on-axis light less than light at larger incident angles.

Generally, the tunable attenuator is sized appropriately to cover at least a portion of the eyepiece of the wearable display system. For example, in some embodiments, the tunable attenuator can have an area of 20 mm×20 mm or more (e.g., having an area in which the shortest dimension is 20 mm).

Figure 9:
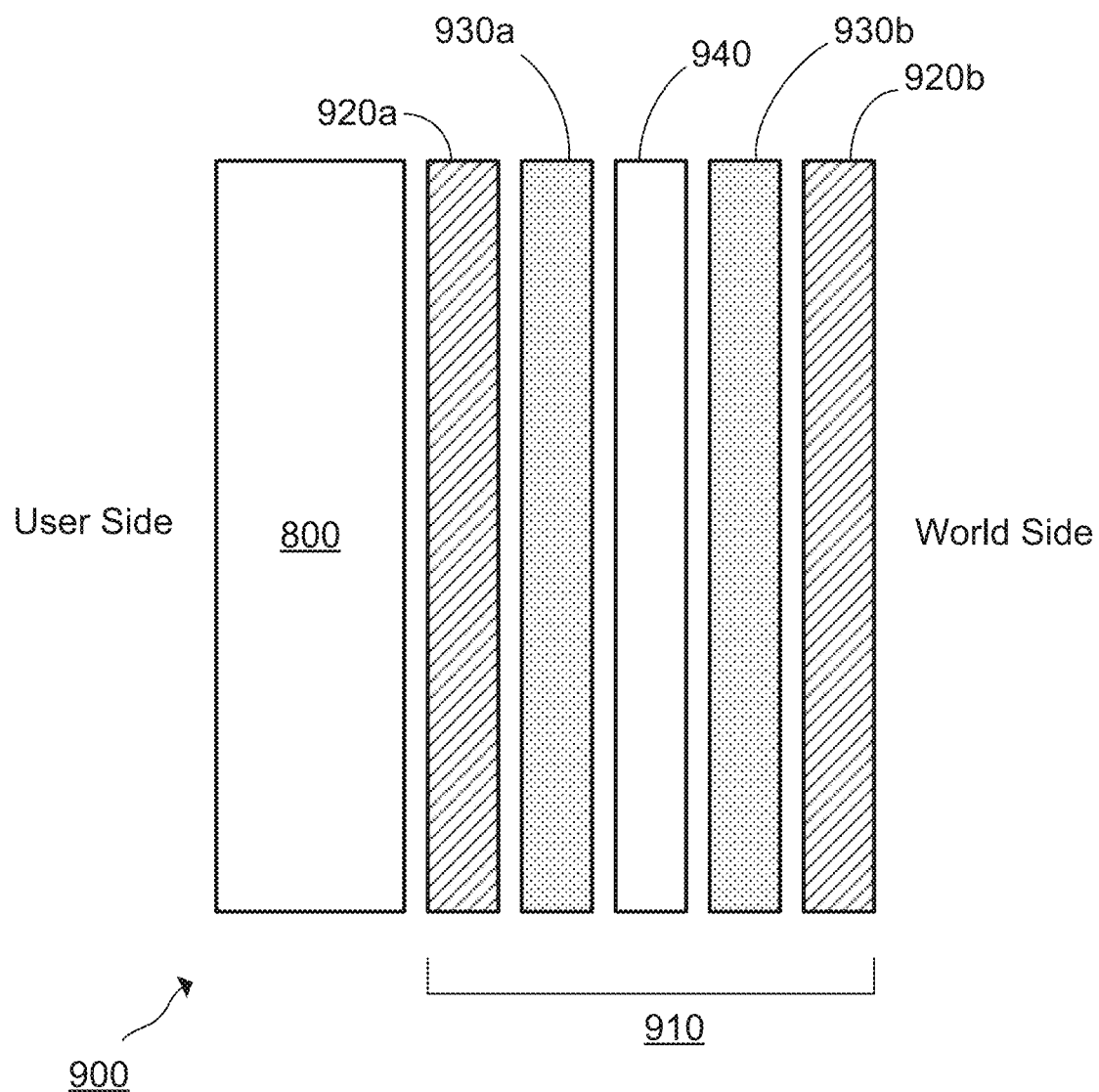
FIG. 9 is a schematic diagram of an eyepiece with a display combiner and an example of a tunable attenuator.

Turning now to specific examples of tunable attenuators and with reference to FIG. 9, an eyepiece 900 for a wearable display system includes display combiner 800 and a stack 910 that operates as a tunable attenuator. Stack 910 includes a pair of linear polarizers 920a and 920b. Between the linear polarizers, stack 910 includes a pair of quarter waveplates (QWs) 930a and 930b on either side of a tunable birefringent layer 940 (e.g., a liquid crystal layer).

In some implementations, the fast axes of the waveplates 930a and 930b are oriented at approximately 45° to the pass axes of linear polarizers 920a and 920b, respectively, so that the combination of linear polarizer 920b and QW 930b convert unpolarized light incident from the world side to substantially circularly polarized light (i.e., the combination behaves as a circular polarizer). The combination of QW 930a and linear polarizer 920a behave similarly. Note the handedness of each circular polarizer are the same.

In at least one state, tunable birefringent layer 940 can have zero retardance for normally incident light but has non-zero retardance for obliquely incident light. Without wishing to be bound by theory, the retardation of a tunable birefringent layer as a function of incident angle can be given by: $\Gamma = n_o\, k_o d\sqrt{(1-\sin^2\theta/n_e^2)-(1-\sin^2\theta/n_o^2)}$, where $n_o$ is the ordinary refractive index of the tunable birefringent layer, $n_e$ is the extraordinary refractive index of the tunable birefringent layer, $\theta$ is the angle of incidence with respect to the normal to the tunable birefringent layer interface, $k_o = 2\pi/\lambda$, is the wavenumber of the incident light, $\lambda$ is the wavelength of incident light, and d is the thickness of the tunable birefringent layer. In addition, the effective refractive indices, $n_o$ and $n_e$, of the tunable birefringent layer are capable of being modified by applying a non-zero voltage to the tunable birefringent layer. By using circularly polarized light, the excitation of the ordinary and extraordinary modes in the tunable birefringent layer for all angles of incidence is roughly equal. This leads to transmission from the input circular polarization state into the same circular polarization state at the output of $T=\cos^2(\Gamma/2)$.

Figure 10:
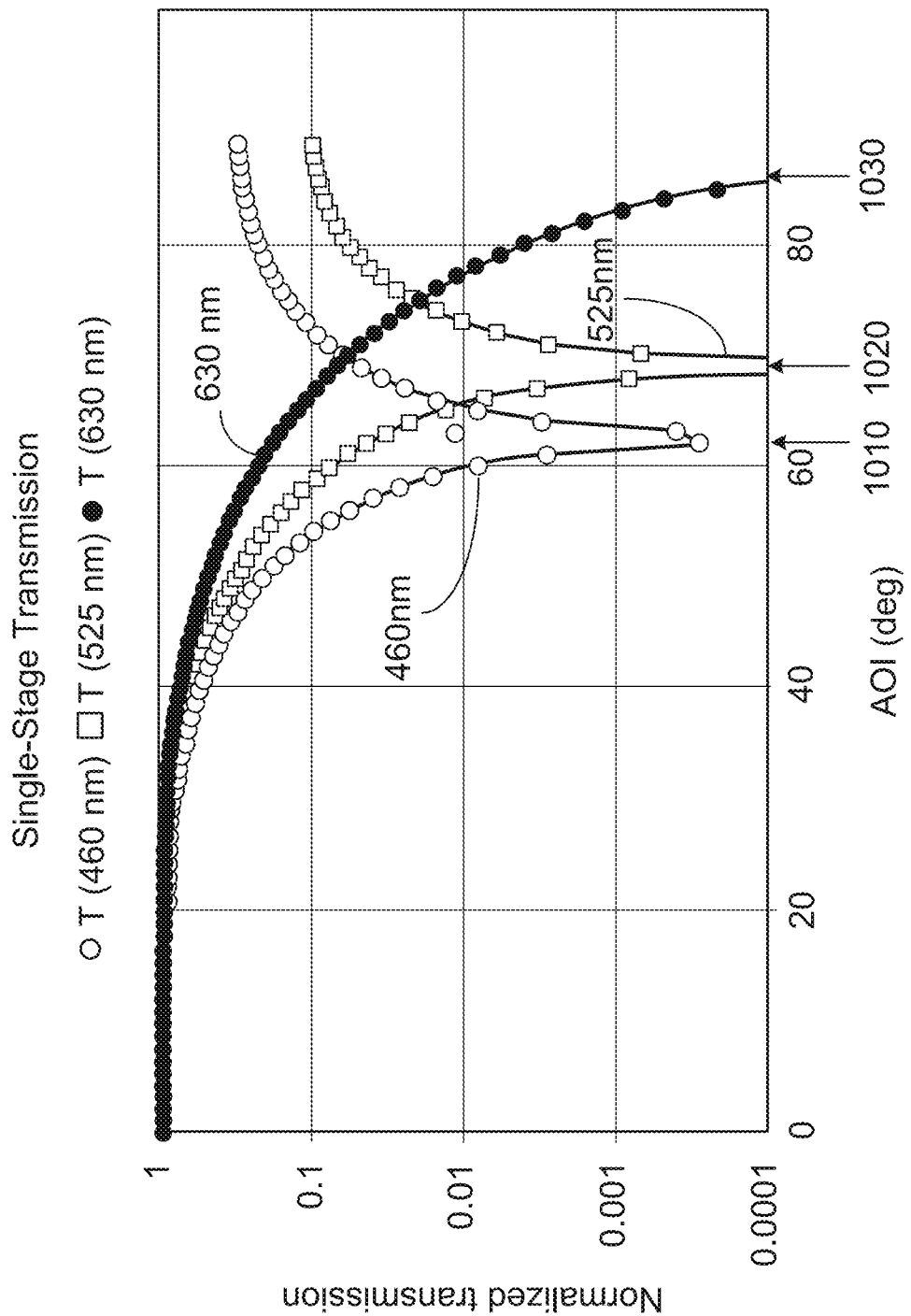
FIG. 10 is a plot showing transmission for three different wavelengths as a function of incident light angle through an example of a tunable attenuator.

In general, the transmission characteristics of stack 910 vary depending on the properties of tunable birefringent layer 940 (e.g., the thickness and birefringence of the material forming the layer) and the applied voltage. An example of transmission as a function of incident angle for an example implementation of stack 910 is shown in FIG. 10. Here, transmission as a function of incident angle is shown for a tunable attenuator configured as a C-plate with $n_o=1.5236$, $n_e=1.52$, and thickness d=153 μm at three different wavelengths. The tunable attenuator simulated to produce FIG. 10 is of the same configuration as FIG. 9, e.g., two linear polarizers, two quarter wave plates, and a tunable birefringent layer. Transmission, here, is normalized to unity for on-axis light and remains at 1 or close to 1 out to approximately 20°, after which it declines monotonically to zero between 60° and 80°, depending on the wavelength. For shorter wavelengths (e.g., 460 nm and 525 nm), after a narrow peak attenuation window at 1010 and 1020 the transmission increases as angles of incidence increase out to 90°.

In a tunable birefringent layer, the values for $n_o$ and $n_e$ are dependent on voltage applied to the tunable birefringent layer. This means that the transmission as a function of incident angle is also dependent on the voltage applied to the tunable birefringent layer. Further, the minima associated with transmissions at varying wavelengths, at 1010, 1020, and 1030, can be tuned to match the angle of incidence of a specific light source (e.g., an overhead lamp or the sun), e.g., detected using a world-side sensor.

The effect of using a tunable attenuator is illustrated in plots shown in FIGS. 11A-I. These plots compare rainbow artifacts formed by an eyepiece grating without an attenuator (FIGS. 11A, D, G), with a static attenuator (FIGS. 11B, E, H), and with a tunable attenuator (FIGS. 11C, F, I) when light from an ambient light source is incident upon a lens for three different non-zero angles of incidence. The rainbow artifacts are caused by dispersion of different wavelengths constituting white light from ambient sources due to diffraction by grating structures in a display combiner at a non-zero angle of incidence (as illustrated in FIG. 7B, discussed above).

In FIGS. 11A-I the optical rainbow artifact is shown for a white-light source with a 5800K blackbody spectra incident on the device from above at 70° (FIGS. 11A-C), 60° (FIGS. 11D-F), and 50° (FIGS. 11G-I) angles of incidence. A grating with a pitch of 390 nm was used to calculate the diffraction angles of the artifact. The images in column 1110 show the perceived rainbow artifact if no filter is present. The images in column 1120 show a reduction in the intensity of the rainbow artifact when a static C-plate filter with peak retardation at 550 nm is used. The images in column 1130 show a further reduction in artifact intensity over the images in column 1110 when the voltage controlling the retardation of a tunable birefringent layer in a film stack is chosen with respect to the angle of incidence of the light source. In FIG. 11C, transmission is modeled for a tunable attenuator with a peak retardation at 450 nm; in FIG. 11F, transmission is modeled for the tunable attenuator with a peak retardation at 660 nm; and in FIG. 11I, transmission is modeled for a peak retardation at 900 nm.

While using a tunable attenuator in a film stack (e.g., stack 910), there can be a tradeoff with a color shift in the user's view of the world as seen through the eyepiece 900. As the angle of incidence of light from an ambient light source is reduced, the peak retardation of the tunable attenuator should be tuned to attenuate any artifacts as seen by the user as described in FIGS. 11A-I.

Figure 12A:
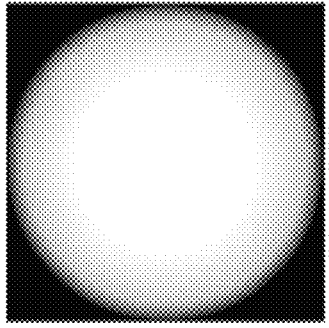
FIGS. 12A, 12C, and 12E are charts showing perceived color shifts at three different retardation values.

However, as the peak retardation of the tunable attenuator is modified, there may be a perceived color shift in the transmitted light. This effect is illustrated in FIGS. 12A-12F, which depicts transmission properties of tunable attenuators set at the optimal peak retardations of 550 nm (FIGS. 12A and 12B), 660 nm (FIGS. 12C and 12D), and 900 nm (FIGS. 12E and 12F). FIGS. 12A, 12C, and 12E depict a simulated aperture for these three optical peak retardations, respectively, spanning a 100° field-of-view vertically and horizontally (from −50° to 50°). The simulated apertures reduces the transmission to zero for angles of incidence greater than 45°.

Figure 12B:
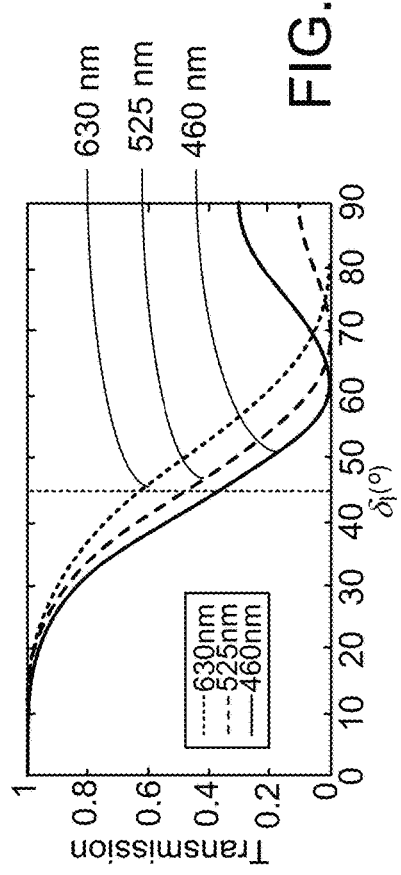
FIGS. 12B, 12D, and 12F are charts showing transmission profiles for three different wavelengths at the three different retardation values.
Figure 12C:
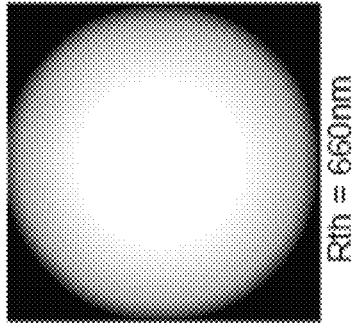
Figure 12D:
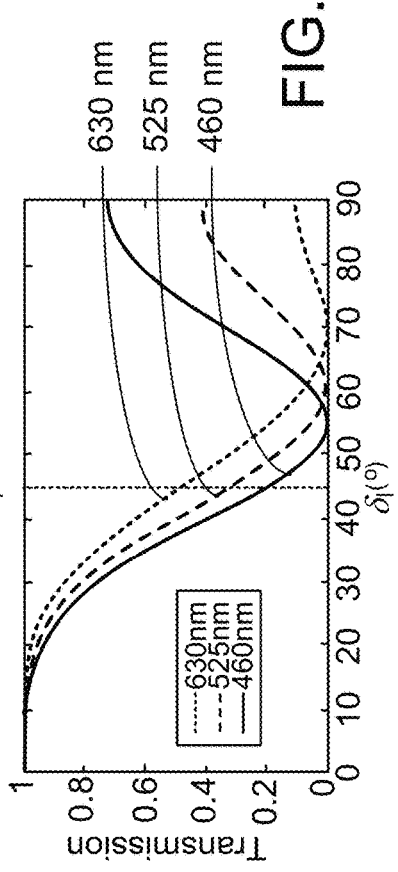
Figure 12E:
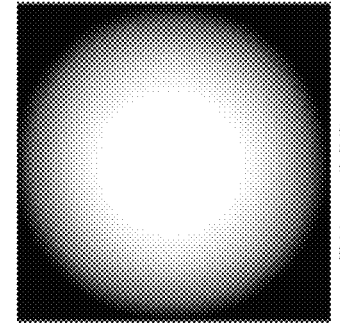
Figure 12F:
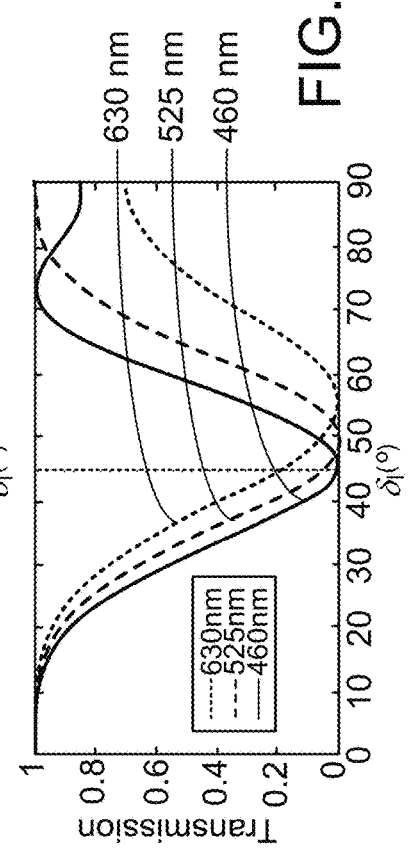

FIGS. 12B, 12D, 12F show transmission curves of transmitted light at 460 nm, 525 nm, and 630 nm as a function of angle of incidence. The dashed line drawn at a 45° incident angle in FIGS. 12A, 12C, and 12E is present to denote where the simulated aperture reduces transmission to zero. In FIGS. 12B, 12D, and 12F, between 0° and 45° angles of incidence the transmission curves of 630 nm (e.g., red) light is shown to have higher transmission than 460 nm (e.g., blue) light, indicative of a lower attenuation of light at 630 nm wavelength. The relative ratio of red to blue light causes the perceived color through the tunable attenuators to shift to a red hue, dependent on the incident angle. This effect can be seen in the simulated fields of view in FIGS. 12A, 12C, and 12E. For example, in FIG. 12F, the transmission curve for 460 nm light is approximately zero at a 45° incident angle while the light at 630 nm wavelength light still has an approximate relative transmission value of −0.2. This is demonstrated by a circumferential red hue around the edge of the field of view in FIG. 12E.

Figure 13:
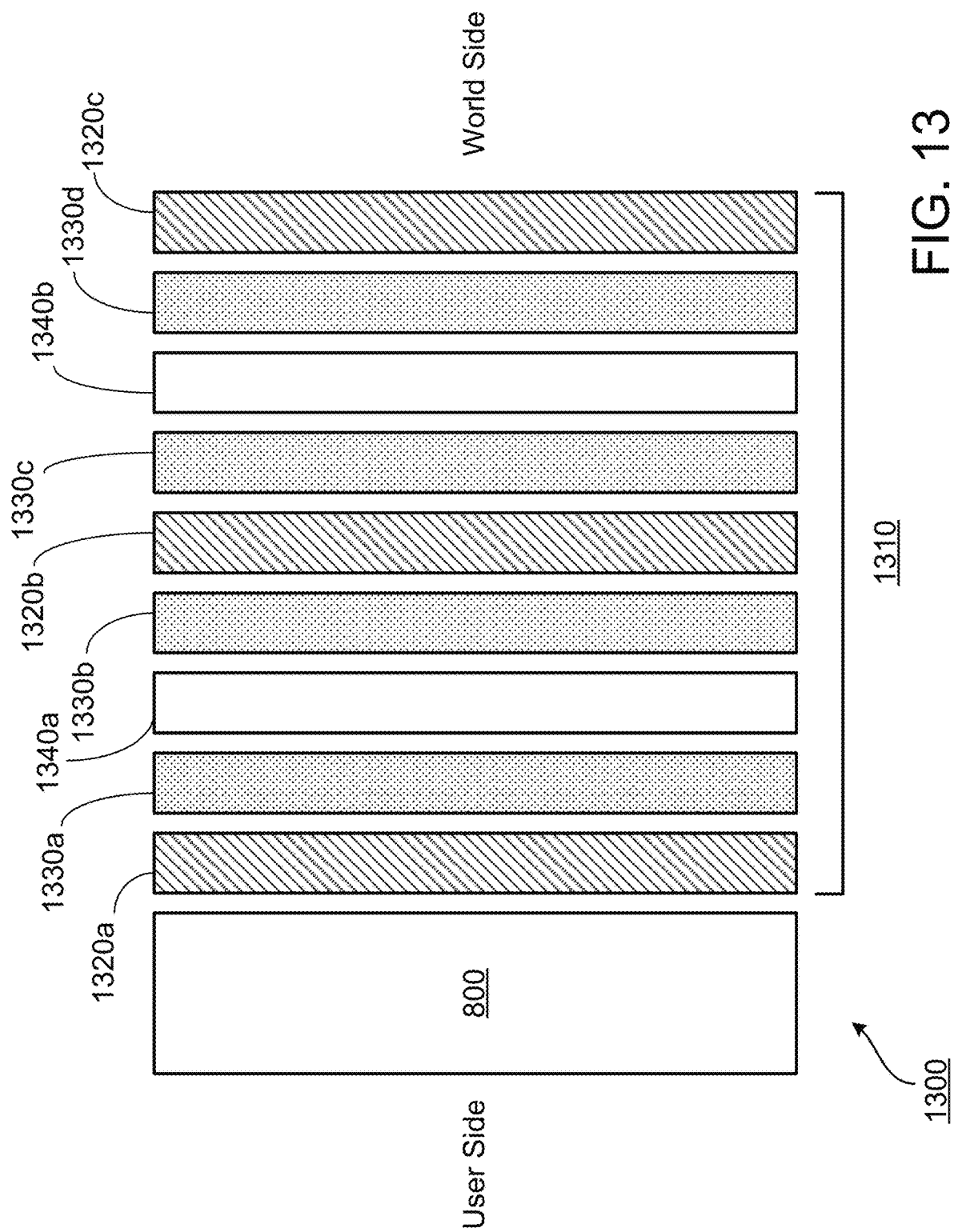
FIG. 13 is a schematic diagram of an eyepiece with a display combiner and another example of tunable attenuator.

In general, while FIG. 9 shows an example of a tunable attenuator that includes a single tunable birefringent layer 940 between two linear polarizers 920, implementations with additional layers are possible. For example, FIG. 13 shows an eyepiece 1300 that includes a film stack 1310 applied to the world side of display combiner 800. Film stack 1310 includes three linear polarizers 1320a, 1320b, and 1320c. A first polarization adjustment stack is arranged between polarizers 1320a and 1320b. This stack includes a pair of QWs 1330a and 130b on either side of a tunable birefringent layer 1340a. A second polarization adjustment stack is arranged between polarizers 1320b and 1320c. This stack includes QWs 1330c and 1330d on either side of a tunable birefringent layer 1340b. Effectively, stack 1310 performs like two stacks 910 placed together.

Stack 910 can be considered a "single stage" arrangement, and stack 1310 a double stage. Generally, additional stages can be added. Without wishing to be bound by theory, several stages may be used in series to provide a different transmission response $$T = \Pi_n \cos^2\left(\frac{\Gamma_n}{2}\right)$$

where $\Gamma_n$ is the retardation of the $n^{th}$ stage and varies as a function of applied voltage.

Figure 14:
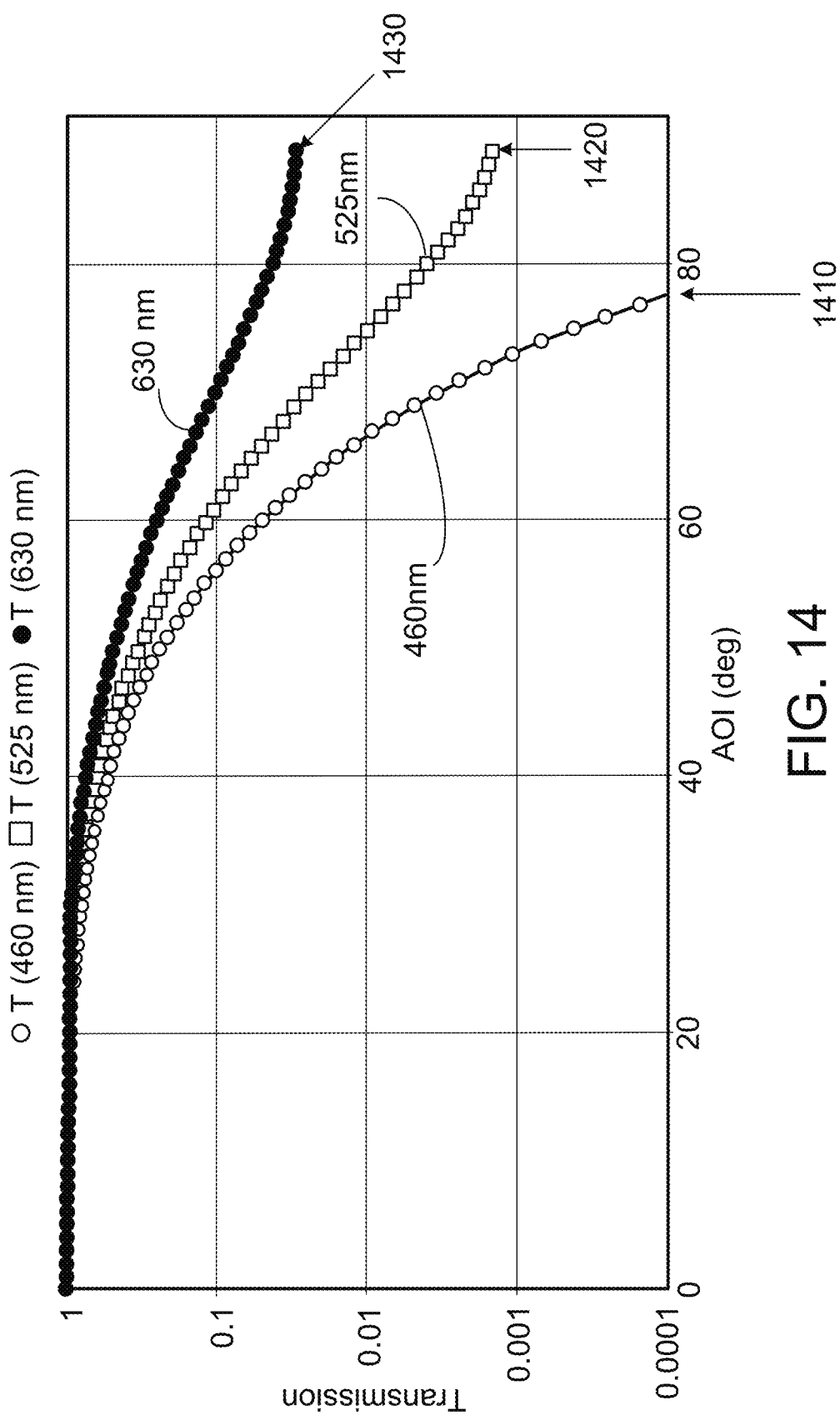
FIG. 14 is a plot showing transmission as a function of incident light angle through multiple tunable attenuators for three different wavelengths.

The use of multiple stages in series can enable stronger attenuation of light from large angles of incidence. For example, referring to FIG. 14, transmission for three different wavelengths as a function of incident angle for a two-stage tunable attenuator arrangement, such as stack 1310, is shown. In this example, $n_o=1.5236$, $n_e=1.52$ for tunable birefringent layers 1340a and 1340b, the thickness of the tunable birefringent layer in the first stage 1340b is $d_1=111$ μm, and the thickness of the tunable birefringent layer in the second stage 1340a is $d_2=111$ μm. Compared to the single stage film depicted in FIG. 10, FIG. 14 demonstrates transmission for all three wavelengths is normalized to unity for on-axis light and remains at or close to 1 out to approximately 20°, after which they decrease asymptotically at for wavelengths around 460 nm but monotonically at longer wavelengths (e.g., 525 nm and 630 nm) to a peak, non-zero attenuation value at 90° of incidence. At high angles of incidence out to 90°, transmission remains low at 460 nm and 525 nm, rather than increase from a minimum value between 60° and 80°. Transmission no longer increases after the peak attenuation angle, unlike transmission at these wavelengths as depicted in FIG. 10.

Figure 15:
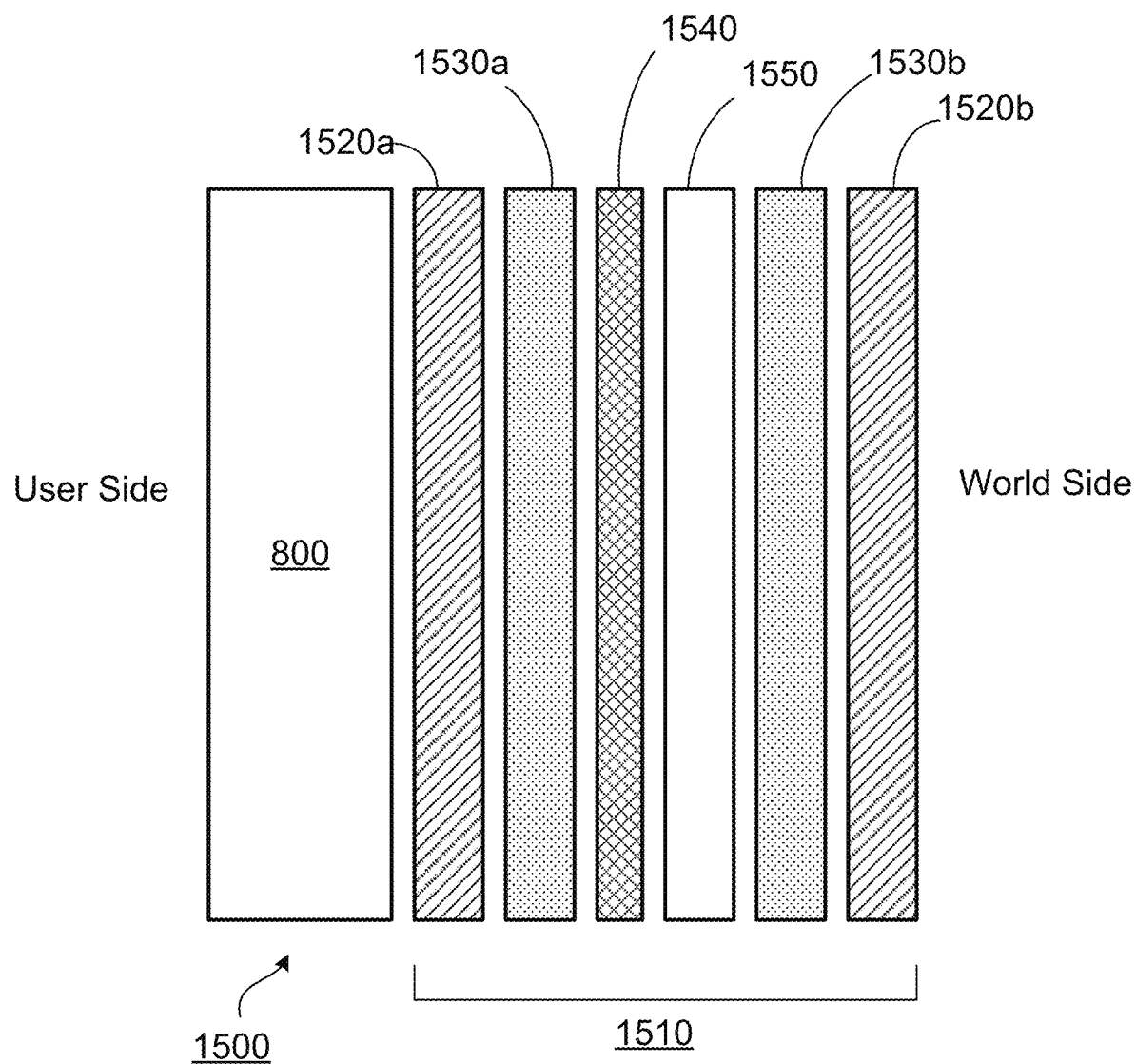
FIG. 15 is a schematic diagram of an eyepiece with a display combiner and yet a further example of a tunable attenuator in combination with a static C-plate.

When using multiple stages in a film stack, the second layer may be a layer that is not a tunable birefringent layer, i.e., it can be a static layer. FIG. 15 shows an example tunable attenuator 1510 that uses a tunable birefringent layer 1550 in conjunction with a static C-plate 1540. The C-plate 1540 has zero retardance for normally incident light but has static, non-zero retardance for obliquely incident light. When a tunable birefringent layer 1550 is used in conjunction with a static C-plate 1540, the C-plate 1540 provides the initial retardation and a tunable birefringent layer provides an additional and variable amount of retardation to provide the total needed amount of retardation, F, for the environment. The addition of a static C-plate layer 1540 can help reduce the driving voltage and thickness of the tunable birefringent layer.

Figure 16:
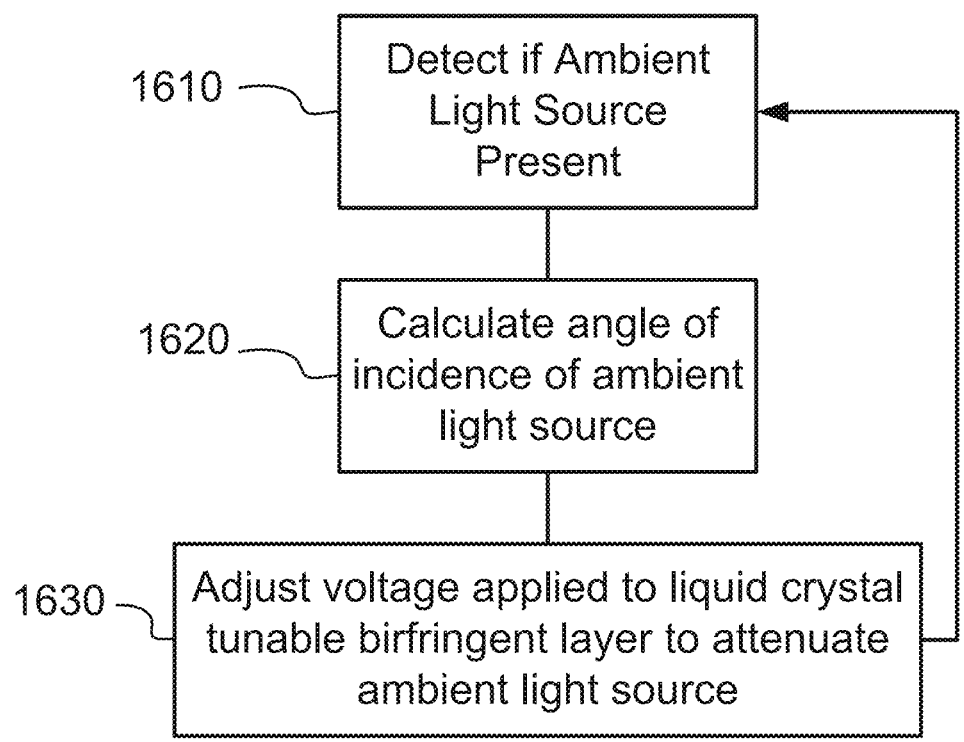
FIG. 16 is a flowchart detailing an example voltage control feedback mechanism for ambient light attenuation.

In general, a wearable display system using a tunable attenuator may detect and attenuate an ambient light source to eliminate optical artifacts (e.g., optical rainbows). The wearable display system can control the tunable attenuators to attenuate ambient light sources at different incident angles by applying a differential voltage to the tunable birefringent layer. An example method for particular attenuation of light from an ambient light source is shown in FIG. 16. For example, the image data from the frame-mounted camera can be sent to the local data processing module which can be programmed to detect the presence of an ambient light source 1610. Areas of high brightness in the image data can be used by the local data processing module to distinguish ambient light sources from the background image in some implementations.

After the presence of an ambient light source in the wearable display system user's field of view has been detected, the angle of incidence of the ambient light source may be calculated by the local data processing module of the wearable display system 1620. The wearable display system may then send instructions to the display to control the voltage applied to the liquid crystal layer of the tunable attenuator 1630. The modified voltage can modify the liquid crystal layer in such a manner as to attenuate the detected ambient light source. After, the system may return to step 1610 to make further determinations if the users field of view has changed (e.g., user is moving, there are more than one ambient light sources).

Example applications for the detection and attenuation of ambient light sources described in FIG. 16 are depicted in FIGS. 17A and 17B. In FIG. 17A, an ambient light source 1710 emits light 1720 that strikes the tunable attenuator at a first angle of incidence 1730. By applying a voltage to the tunable attenuator 1750, the ambient light may be attenuated 1770. In FIB. 17B, an ambient light source 1710 emits light 1720 that strikes the tunable attenuator at a different angle of incidence 1740. By applying a different voltage to the tunable attenuator 1750, the ambient light may be attenuated 1770 for its specific incident angle 1740. In this way, the transmission minima associated with different wavelengths of light (1010, 1020, and 1030) maybe tuned to attenuate a particular ambient light source at a unique angle of incidence.

Further, multiple ambient light sources at respective incident angles and intensities may be attenuated in a user's field of view. FIG. 18 shows three ambient light sources at a first intensity, $S_1$ 1810, a second intensity, $S_2$ 1820, and third intensity, $S_3$ 1830, incident upon a tunable attenuator 1850. Operating in a time sequential operating mode, these ambient light sources may be attenuated for their respective intensity and incident angle. Certain tunable birefringent layers have a temporal response (<1 ms) faster than the frequency at which a new visual image frame is displayed to a user (<~0.03 s). If the total time between frames displayed to a user is given as $t_{total}$, this can be subdivided according to n ambient light sources in user's field of view. The total division is given as $t_{total} = \Delta t_1 + \Delta t_2 + \ldots + \Delta t_n$. After the intensity of each ambient light source has been determined, a sub-frame time is calculated in which a specific light source will be primarily attenuated. If the intensity of three ambient light sources $S_1$ 1810, $S_2$ 1820, and $S_3$ 1830 are related such that $S_2 > S_3 > S_1$, then the sub-frame times may be calculated such that $\Delta t_2$ 1880 > $\Delta t_3$ 1890 > $\Delta t_1$ 1870, as shown in FIG. 18. By performing this function, each ambient light source at a respective intensity level, n, may be attenuated within the respective sub-frame time interval, $t_n$. In this manner, light from multiple ambient light sources can be attenuated based on their respective intensity and incident angle within a single user-displayed frame.

In general, a variety of applicable LC phases and modes can be used in a tunable birefringent layer. For example, in some embodiments, a blue-phase liquid crystal (BPLC) may be used as the tunable birefringent layer. BPLC displays are optically isotropic when no voltage is applied. In other words, the refractive indices of the BPLC medium are equal in three principal directions of the birefringent layer (e.g., $n_z = n_x = n_y$). When voltage is applied, for liquid crystal molecules with positive dielectric anisotropy, the liquid crystal molecules align with the resulting electric field and induce birefringence in the layer. For appropriate electrode geometries, the BPLC layer can function as the tunable C-plate inducing positive or negative birefringence depending on the birefringence of the LC material. For example, in a BPLC material with positive dielectric anisotropy and with positive birefringence, the index ellipsoid describing the orientation of the refractive indices becomes $n_o = n_x = n_y$, $n_z = n_e$, and $n_o < n_e$ where $n_e$ is aligned along the electric field. In a BPLC material with negative birefringence, the index ellipsoid describing the orientation of the refractive indices is defined by $n_o > n_e$ and $n_o$ is aligned orthogonally to the applied electric field. This effect is illustrated in FIGS. 19A-19C. In particular, FIG. 19A shows the index ellipsoid of an isotropic optical medium, i.e., in the zero-voltage state of the BPLC layer. FIG. 19B shows the index ellipsoid of positive birefringent LC material with positive dielectric anisotropy when sufficient voltage is applied to the layer to align the LC molecules with the corresponding electric field, E. FIG. 19C shows the index ellipsoid of a negative birefringent LC material with positive dielectric anisotropy when sufficient voltage is applied to the layer to align the LC molecules with the electric field.

In certain embodiments, vertically aligned nematic liquid crystal (VAN) materials may be used between the two circular polarizers in a film stack 910. A layer of vertically aligned liquid crystal (VALC) is optically equivalent to a positive C-plate compensation film with the added benefit that the retardation may be tuned by application of a voltage in much the same way as is done with conventional liquid crystal displays (LCDs).

Figure 20:
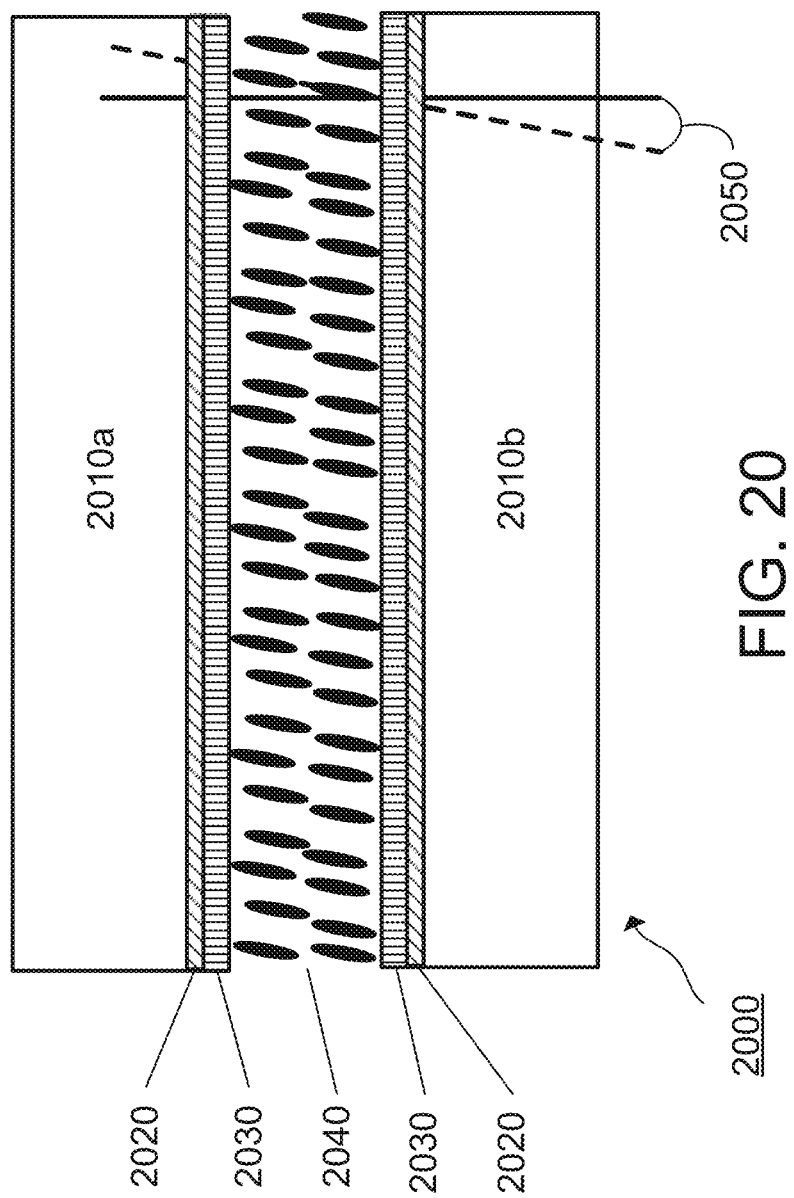
FIG. 20 is a schematic diagram of an example electro-optic cell with a vertically-aligned nematic liquid crystal layer.

A typical VALC device 2000 is shown below in FIG. 20. A typical VALC device includes a layer 2040 of a vertically aligned LC material between two substrates 2010. Each substrate 2010 supports a transparent electrode 2020 on the surface facing LC layer 2040, and an alignment layer 2030 on the transparent electrode.

A voltage source (not shown) is connected to each electrode 2020 to apply a voltage across the LC layer 2040. Alignment layers 2030 control alignment of the LC molecules at the boundaries of the LC layer 2040, thereby controlling the zero-voltage orientation of the LC molecules within LC layer 2040. Generally, alignment layers 2030 control the alignment by introducing a pre-tilt angle 2050 (a) which ensures that the molecules uniformly orient when an applied voltage is removed, reducing introduction of disclinations or other orientation defects into the LC layer. This pre-tilt angle is typically between 1° and 5° (e.g., 2°, 3°, 4°) with respect to the surface normal of the substrate 2010 and can be established by physical rubbing of a polymer layer with cloth or by exposure to linearly polarized UV light (processes are material dependent and known in the art).

In such a device the retardation may be tuned uniformly across the active area of the device if a single electrode 2020 is used. In some embodiments, electrode 2020 may be patterned such that the retardation may be tuned in a spatially varying manner. The electrodes may be generally rectangular in shape and configured in a Cartesian grid (like a conventional LCD) to define an arbitrary retardation profile or a series of concentric circles with fixed or varying widths to define a rotationally symmetric retardation profile.

Figure 21B:
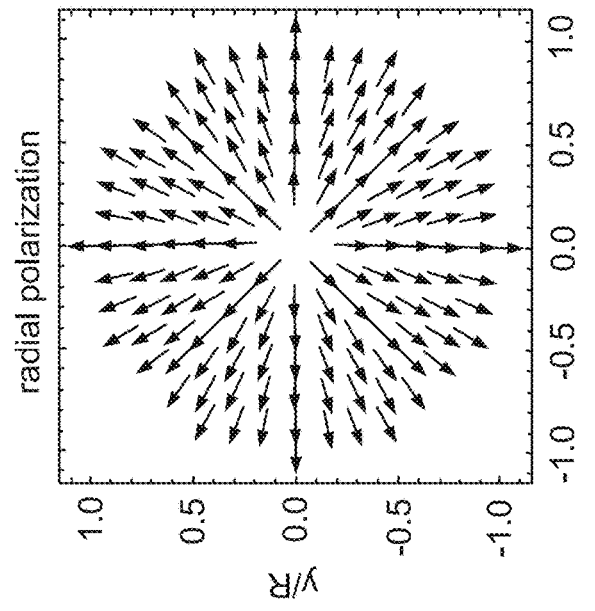
FIG. 21A-21C are plots showing example surface alignment patterns in devices using a vertically-aligned nematic liquid crystal layer.
Figure 21A:
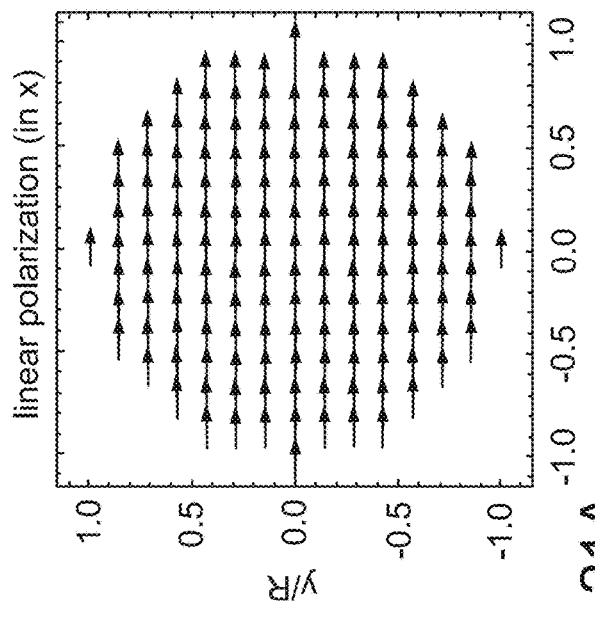
Figure 21C:
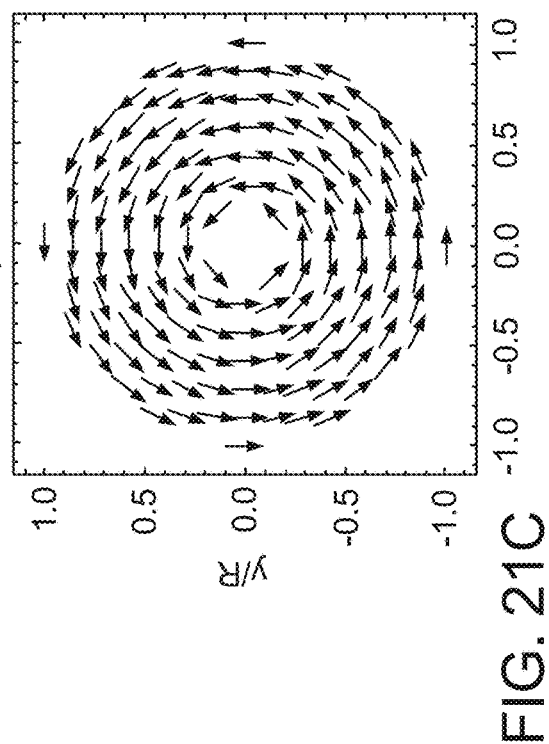

While the pre-tilt angle 2050 is often uniform and unidirectional across the surface of substrate 2010, such as depicted in FIG. 21A, in some cases it may be spatially varied. Spatial variation of the pre-tilt can be used regardless of whether uniform or patterned electrodes are used. This can used to implement a retardation profile that is unachievable using a patterned electrode structure or to implement a retardation profile without the need to pattern the electrode. While any appropriate pattern of the pre-tilt angle 2050 may be realized, in certain embodiments the pre-tilt angle 2050 may be purely radial (e.g., pointing radially away from the central z-axis), as depicted in FIG. 21B, or purely azimuthal (e.g., proceeding circularly around the central z-axis) as depicted in FIG. 21C.

A variety of suitable different materials can be used for each of the layers in an angularly selective film. Linear polarizers, for example, can be formed from stretched polymer material (e.g., PVA) that has been stained with a chromophore (e.g., iodine). Commercially available linear polarizers, such as those available from Sanritz Co. (Japan) or Nitto Denko (Japan), can be used. QWs can be made from stretched polymer films or liquid crystal polymer films, for example. C-plates can be formed from cast polymer films, such as case cellulose triacetate, for example. Liquid crystal polymer C-plates are also possible.

Generally, while each layer is represented as a homogenous layer, composite layers are possible. For example, C-plates can be formed from multiple stacked layers each having different optical properties from its adjacent layers. Similarly, multilayer QWs can be used.

In general, the film stacks can include additional layers beyond those described above. For instance, stacks can include additional layers to provide mechanical functions, rather than optical functions. Adhesive layers and/or layers for mechanical strength and/or environmental protection can be included. Such layers can be optically isotropic, so as to not significantly impact polarization of transmitted light. In some embodiments, the stack includes one or more layers on the world side of the outermost linear polarizer. For instance, antireflection films and/or hardcoat layers can be included.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 22:
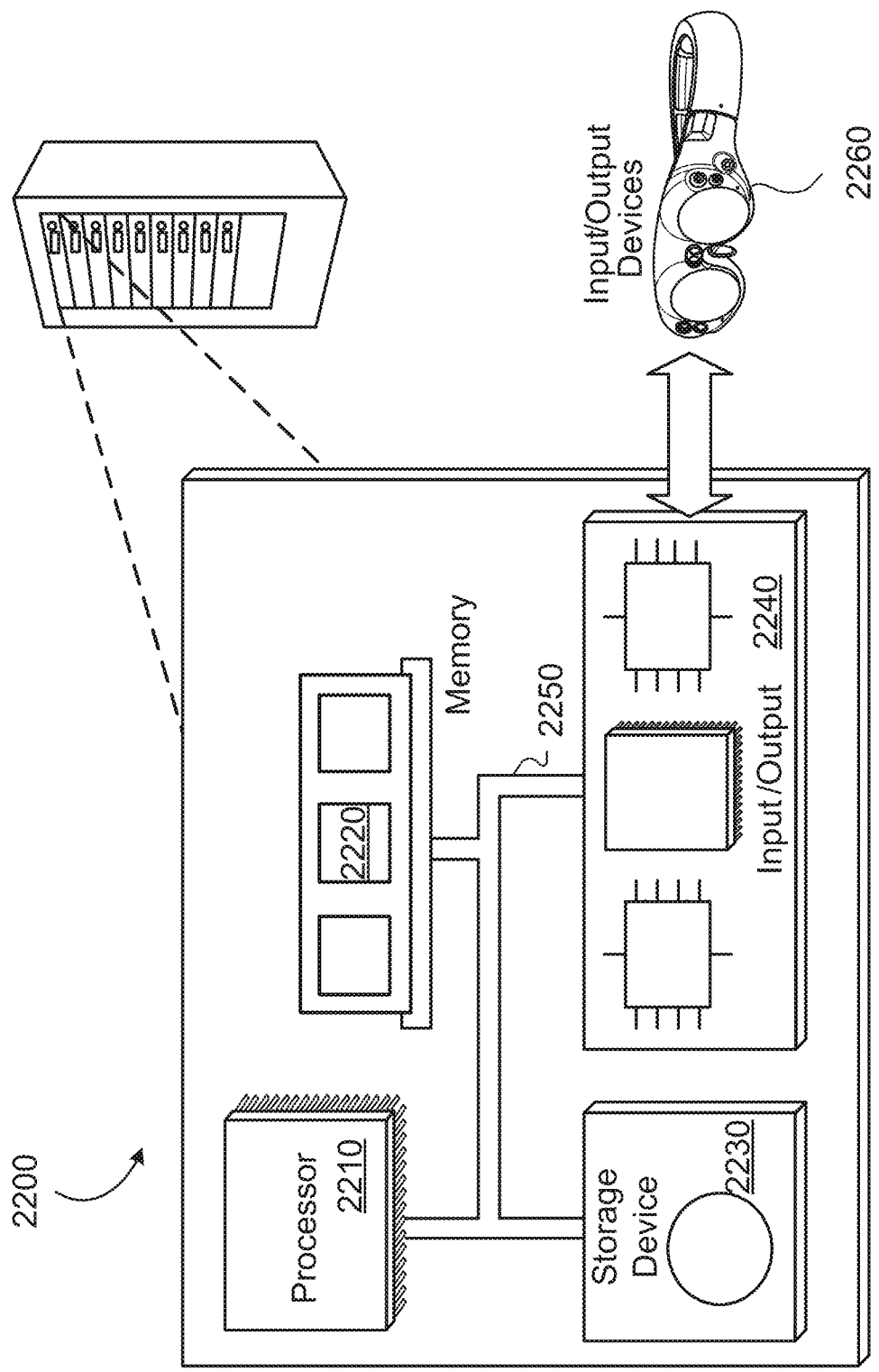
FIG. 22 is a diagram of an example computer system useful with a wearable display system.

FIG. 22 shows an example computer system 2200 that includes a processor 2210, a memory 2220, a storage device 2230 and an input/output device 2240. Each of the components 2210, 2220, 2230 and 2240 can be interconnected, for example, by a system bus 2250. The processor 2210 is capable of processing instructions for execution within the system 2200. In some implementations, the processor 2210 is a single-threaded processor, a multi-threaded processor, or another type of processor. The processor 2210 is capable of processing instructions stored in the memory 2220 or on the storage device 2230. The memory 2220 and the storage device 2230 can store information within the system 2200.

The input/output device 2240 provides input/output operations for the system 2200. In some implementations, the input/output device 2240 can include one or more of a network interface device, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., wearable display system 2260. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A wearable display system, comprising:
a frame, wearable by a user as eyewear, the frame housing an eyepiece stack having a world side and a user side opposite the world side, wherein during use the user positioned on the user side views displayed images delivered by the wearable display system via the eyepiece stack which augment the user's field of view of the user's environment;
a tunable attenuator arranged on the world side of the of the eyepiece stack, the tunable attenuator comprising a first electro-optic cell and a second electro-optic cell separated from the first electro-optic cell by a first linear polarizer, and the first electro-optic cell, the second electro-optic cell, and the first linear polarizer are arranged between a pair of linear polarizers;
a camera module mounted to the frame and facing the world side; and
an electronic processing module in communication with the tunable attenuator and the camera module, the electronic processing module being programmed to determine information about an angle of incidence of light from an ambient light source based on images captured by the camera module and to vary the attenuation of the tunable attenuator based on the angle of incidence,
wherein for at least one state of the first electro-optic cell and the second electro-optic cell, the tunable attenuator attenuates incident light such that all light having a wavelength in a wavelength range from 460 nm to 630 nm transmitted through the tunable attenuator has a transmission of greater than 10% compared to a transmission of normally incident light for angles of incidence of less than 50° and a transmission of less than 10% compared to the transmission of normally incident light for angles of incidence greater than 70°.

2. The wearable display system of claim 1, wherein the electronic processing module is programmed to vary the attenuation of the tunable attenuator by controlling an optical state of the first electro-optic cell and the second electro-optic cell to reduce transmission of visible light incident on the tunable attenuator by an amount dependent on the angle of incidence within a first range of incident angles.

3. The wearable display of claim 2, wherein the electronic processing module is programmed to control the tunable attenuator to reduce the transmission of visible light incident on the tunable attenuator in the first range of incident angles without significantly reducing transmission of light incident on the tunable attenuator at angles of incidence outside the first range.

4. The wearable display system of claim 1, wherein the first electro-optic cell and the second electro-optic cell each comprise a layer of a liquid crystal material and the tunable attenuator further comprises a voltage source arranged to apply a variable voltage to each of the liquid crystal materials.

5. The wearable display system of claim 4, wherein the tunable attenuator further comprises at least one layer of a birefringent material in addition to the layer of the liquid crystal material of the first electro-optic cell and the second electro-optic cell.

6. The wearable display system of claim 5, wherein the at least one layer of the birefringent material comprises a pair of quarter wave plates, the quarter wave plates being disposed on opposite sides of the layer of liquid crystal material of the first electro-optic cell and the second electro-optic cell.

7. The wearable display system of claim 6, wherein each of the pair of quarter wave plates of the first electro-optic cell and the second electro-optic cell is arranged relative to a corresponding one of the linear polarizers to form a circular polarizer.

8. The wearable display system of claim 6, wherein the at least one layer of birefringent material further comprises a C-plate.

9. The wearable display system of claim 1, wherein one of the first electro-optic cell or the second electro-optic cell rotates a polarization state of light transmitted by a first linear polarizer of the pair of linear polarizers on the world side of the tunable attenuator.

10. The wearable display system of claim 9, wherein an amount of rotation of the polarization state varies depending on a state of the first electro-optic cell or the second electro-optic cell and an angle of incidence of light transmitted by the first linear polarizer of the pair of linear polarizers.

11. The wearable display system of claim 10, wherein the light transmitted having large angles of incidence is rotated less than the light transmitted having small angles of incidence.

12. The wearable display system of claim 1, wherein the tunable attenuator has an area greater than 50 mm×50 mm.

13. The wearable display system of claim 1, wherein the first and second electro-optic cells are each composed of a corresponding layer of a liquid crystal material.

14. The wearable display system of claim 13, wherein the tunable attenuator further comprises one or more layers of birefringent materials arranged on opposite sides of each of the corresponding layer of liquid crystal material of the first electro-optic cell and the second electro-optic cell.

15. A wearable display system, comprising:
  a frame, wearable by a user as eyewear, the frame housing an eyepiece stack having a world side and a user side opposite the world side, wherein during use a user positioned on the user side views displayed images delivered by the wearable display system via the eyepiece stack which augment the user's field of view of the user's environment;
  a tunable attenuator arranged on the world side of the of the eyepiece stack, the tunable attenuator comprising an electro-optic cell arranged between a pair of linear polarizers, wherein the electro-optic cell comprises a layer of a blue phase liquid crystal material;
  a camera module mounted to the frame and facing the world side; and
  an electronic processing module in communication with the tunable attenuator and the camera module, the electronic processing module being programmed to determine information about an angle of incidence of light from an ambient light source based on images captured by the camera module and to vary the attenuation of the tunable attenuator based on the angle of incidence, wherein for at least one state of the electro-optic cell, the tunable attenuator attenuates incident light such that all light having a wavelength in a wavelength range from 460 nm to 630 nm transmitted through the tunable attenuator has a transmission of greater than 10% compared to a transmission of normally incident light for angles of incidence of less than 50° and a transmission of less than 10% compared to the transmission of normally incident light for angles of incidence greater than 70°.

16. A method for displaying an image using a wearable display system, comprising:
  directing display light from a display towards a user through an eyepiece to project images in the user's field of view;
  determining a relative location between an ambient light source and the eyepiece; and
  adjusting an attenuation of ambient light from the ambient light source through the eyepiece such that all ambient light having a wavelength in a wavelength range from 460 nm to 630 nm has a transmission of greater than 10% compared to a transmission of normally incident light for angles of incidence of less than 50° and a transmission of less than 10% compared to the transmission of normally incident light for angles of incidence greater than 70°, and depending on the relative location between the ambient light source and the eyepiece, wherein the adjusting comprises, in order:
  polarizing the ambient light to provide polarized light,
  retarding the polarized light by a first amount to provide once retarded polarized light,
  polarizing the once retarded polarized light to provide twice polarized light,
  retarding the twice polarized light to provide twice retarded polarized light, and
  polarizing the twice retarded polarized light to provide thrice polarized light, an intensity of the thrice polarized light being attenuated relative to the ambient light.

* * * * *